(12) United States Patent
Safaei et al.

(10) Patent No.: US 9,743,044 B2
(45) Date of Patent: Aug. 22, 2017

(54) QUALITY CONTROLLER FOR VIDEO IMAGE

(71) Applicant: Smart Services CRC Pty Ltd, Eveleigh, New South Wales (AU)

(72) Inventors: Farzad Safaei, Wollongong (AU); Pedram Pourashraf, Wollongong (AU)

(73) Assignee: ISEE VC PTY LTD, North Sydney, NSW (AU)

( * ) Notice: Subject to any disclaimer, the term of this patent is extended or adjusted under 35 U.S.C. 154(b) by 0 days.

(21) Appl. No.: 14/913,974

(22) PCT Filed: Aug. 29, 2014

(86) PCT No.: PCT/AU2014/000860
§ 371 (c)(1),
(2) Date: Feb. 23, 2016

(87) PCT Pub. No.: WO2015/027283
PCT Pub. Date: Mar. 5, 2015

(65) Prior Publication Data
US 2016/0227172 A1    Aug. 4, 2016

(30) Foreign Application Priority Data

Aug. 29, 2013 (AU) ................... 2013903298

(51) Int. Cl.
| | |
|---|---|
| *H04N 7/15* | (2006.01) |
| *G06T 15/20* | (2011.01) |
| *G06T 19/00* | (2011.01) |
| *H04N 19/132* | (2014.01) |

(Continued)

(52) U.S. Cl.
CPC ............ *H04N 7/157* (2013.01); *G06T 15/20* (2013.01); *G06T 19/006* (2013.01); *H04N 7/147* (2013.01);

(Continued)

(58) Field of Classification Search
CPC combination set(s) only.
See application file for complete search history.

(56) References Cited

U.S. PATENT DOCUMENTS

2004/0128350 A1*  7/2004  Topfl .................. G06Q 10/10
                                                                   709/204
2012/0082242 A1*  4/2012  Narroschke ......... H04N 19/423
                                                                   375/240.25

(Continued)

FOREIGN PATENT DOCUMENTS

WO     WO 2013/003914         1/2013

OTHER PUBLICATIONS

Jumisko-Pyykkö et al., "Subjective evaluation of mobile 3D video content: depth range versus compression artifacts," Proceeding of SPIE, vol. 7881: Multimedia on Mobile Devices 2011, and Multimedia Content Access: Algorithms and Systems V; Snoek, C.G.M. et al., eds.; Feb. 11, 2011; 12 pp.

(Continued)

*Primary Examiner* — Joseph J Nguyen
(74) *Attorney, Agent, or Firm* — Knobbe, Martens, Olson & Bear, LLP

(57) ABSTRACT

A method for controlling the quality of a displayed video image to meet the perceptual requirements of a viewer, comprising the steps of determining the location and orientation of a viewer with respect to a video image and varying the quality of the video image in dependence on the location and orientation of the viewer.

15 Claims, 19 Drawing Sheets

(51) Int. Cl.
    *H04N 19/154*    (2014.01)
    *H04N 7/14*    (2006.01)
    *H04N 19/162*    (2014.01)
    *H04N 19/48*    (2014.01)
    *H04N 19/625*    (2014.01)
    *H04N 19/91*    (2014.01)

(52) U.S. Cl.
    CPC ......... *H04N 19/132* (2014.11); *H04N 19/154* (2014.11); *H04N 19/162* (2014.11); *H04N 19/48* (2014.11); *H04N 19/625* (2014.11); *H04N 19/91* (2014.11); *G06T 2215/16* (2013.01)

(56) References Cited

U.S. PATENT DOCUMENTS

2012/0300046 A1* 11/2012 Blayvas ............. G02B 27/0093
    348/54
2013/0125155 A1* 5/2013 Bhagavathy ....... H04N 21/2343
    725/10

OTHER PUBLICATIONS

Pourashraf et al., "Distributed Area of Interest Management for Large-Scale Immersive Video Conferencing," 2012 IEEE International Conference on Multimedia and Expo Workshops (ICMEW 2012), Jul. 9-13, 2012; pp. 139-134.

International Search Report mailed Nov. 11, 2014 in International Application No. PCT/AU2014/000860.

\* cited by examiner

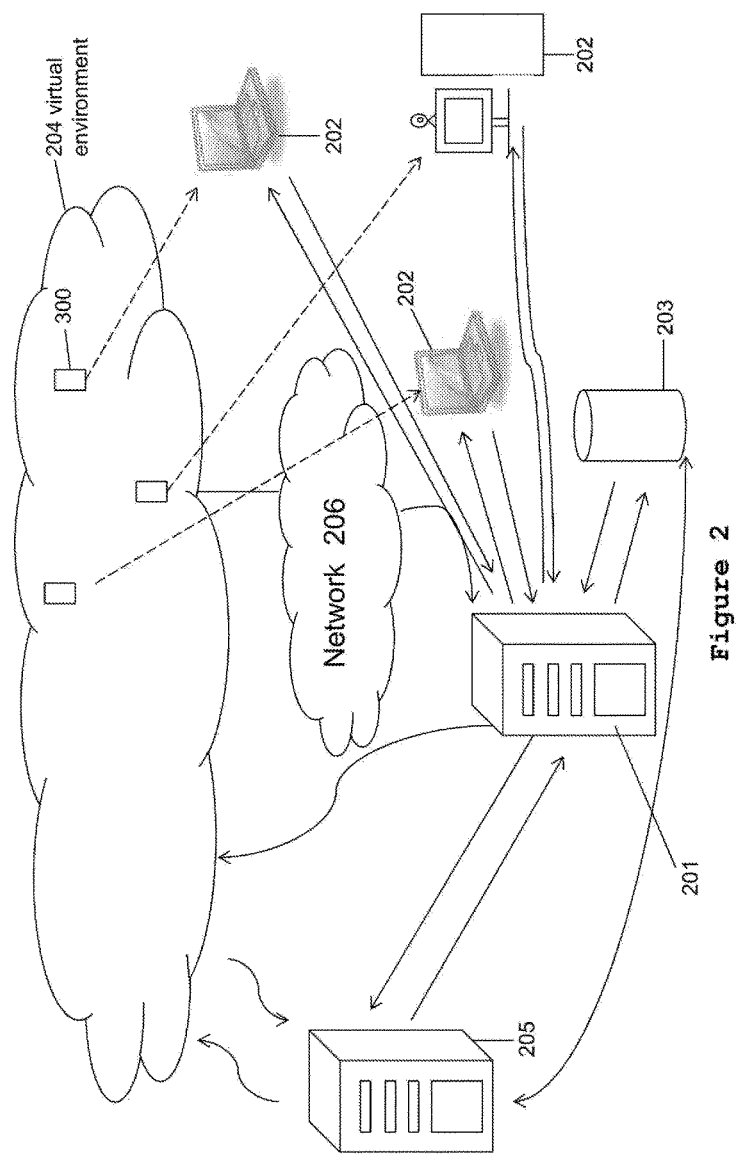

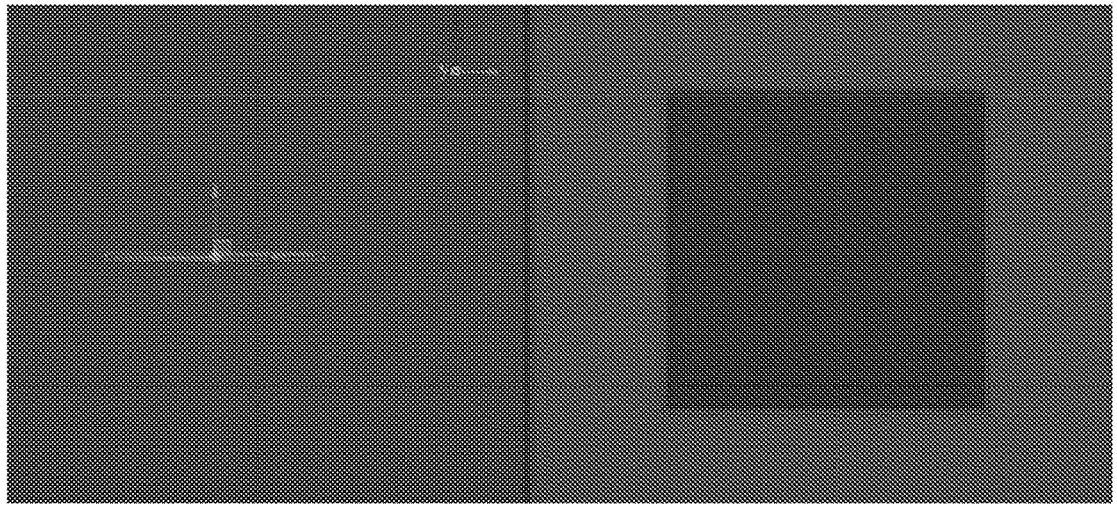
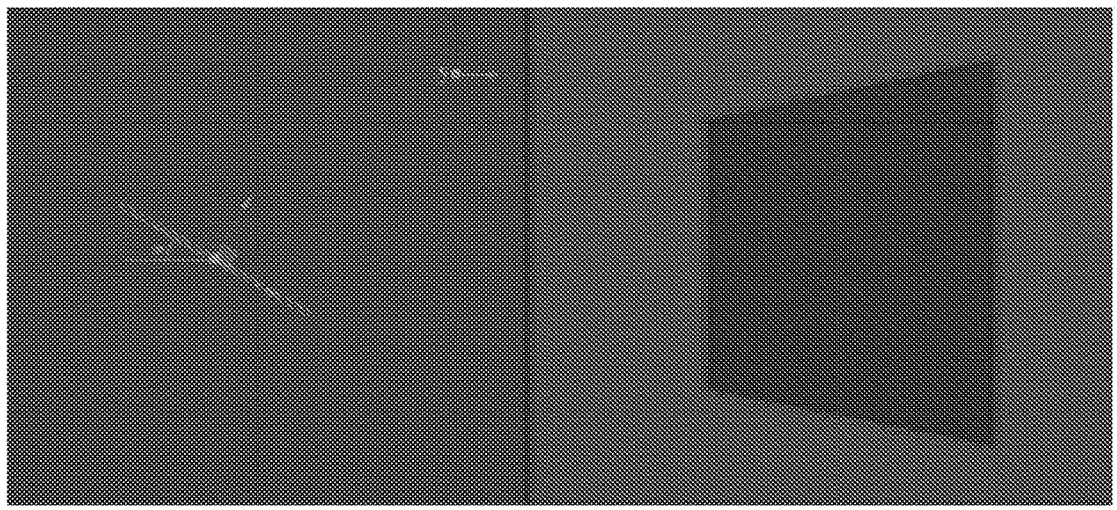
Figure 7

QUALITY CONTROLLER FOR VIDEO IMAGE

The present invention relates to a method and apparatus for controlling the quality of a video image in dependence on the perceptual requirements of a viewer.

BACKGROUND

A three dimensional video conferencing application, hereafter referred to as the immersive video conferencing—IVC, represents a combination of positive attributes of video conferencing systems and distributed virtual environments. Similar to a virtual environment, the participants are represented by an avatar and can roam freely in a three dimensional environment. However, in IVC, the participants' avatars display their real-time video.

Typically, the video of each participant is a 2D video shown on a flat surface of the avatar. However, although the video is 2D, the avatar is free to move and rotate within the three dimensional virtual environment, hence, the video will be presented (rendered) at different three dimensional orientations and distances relative to the viewer.

A key challenge for scalable delivery of IVC is to minimize the required network bit rate required to support many participants in the same session. Both upload and download capacity of a client is of concern. In the case of peer-to-peer (P2P) delivery of IVC, each client must transmit a copy of its video to all others and receive all other videos. Therefore, the required capacity grows linearly with the number of participants (and for the whole application, the required network capacity grows as the square of this number). A video conference server (often called a conference bridge) will solve the upload capacity problem, because each client needs only to send one copy of its video to the server. But the download bottleneck remains since the clients still need to download all videos from the server.

An example of a method to reduce the required network capacity is discussed in applicants' international patent application WO 2013/003914. In this method, the system dynamically evaluates which of the avatars are within the visual range of the viewer (referred to as the viewer's area of interest—AOI). Only those videos that are relevant to the AOI will be downloaded, which results in a significant reduction in overall network capacity consumption.

A current model for video quality differentiation is to use hierarchical video coding (HVC) or multiple description coding (MDC). In both models, the video stream is split into a number of sub-streams, called layers or descriptions in HVC and MDC respectively. The user who receives all the sub-streams will be able to decode the video at the maximum possible quality. If some sub-streams are not sent by the source or dropped by the server/network, the receiver will decode a lower quality video. The primary difference between HVC and MDC is that in HVC the layers are dependent on each other. The user must receive a base layer to be able to decode the video at all. The other layers are enhancement layers that would improve the decoded video but without the base layer cannot be decoded individually. In contrast, the multiple descriptions of MDC are independent of each other and can be decoded in isolation. This flexibility, however, comes at the cost of higher bit rate for the sub-streams.

HVC and MDC were designed for a video distribution (multicast) scenario where there is a heterogeneous population of recipients with different video quality requirements (e.g. a mobile phone versus a TV screen) or bandwidth capacity (wireless versus high-speed landline). But unfortunately, these techniques do not address the needs of an IVC video quality differentiation for the following reasons:

1—Each enhancement layer or description sub-streams is concerned with improving the overall video quality, equally in every part of the video. In IVC, the quality differentiation may not be uniformly distributed over the spatial extend of a video. For example, the video may be partially occluded or the avatar may be rotated and some parts of the video requiring lower quality due to perspective variations.

2—The number of layers or descriptions is usually quite small as it is computationally expensive for the source to produce and manage many different layers. This means that the resulting quality differentiation is rather coarse. However, in IVC we require finer granularity for quality adjustment based on numerous factors, such as virtual distance, angular orientation, etc.

Embodiments of the invention provide techniques to allow individual video streams to be "pruned" before transmission to the client to reduce the bit rate of the video stream while maintaining the perceptual quality of the video image to the viewer (the pruning can take place at the origin in a P2P model or in the server for a server-based IVC). Different participants will have different perspectives. So a particular video stream may be required at many different quality levels depending on the number and relative position of other participants who are looking at this individual at this time. Hence, unlike a point-to-point video telephony scenario, it is not possible for the source to simply adjust its video coding parameters based on the receiver's requirement.

SUMMARY OF INVENTION

In a first aspect, the invention provides a method for controlling the quality of a displayed video image to meet the perceptual requirements of a viewer, comprising the steps of:
determining the location and orientation of a viewer with respect to a video image; and, varying the quality of the video image in dependence on the location and orientation of the viewer.

In a second aspect, the invention provides a method for controlling the quality of a displayed video image to meet the perceptual requirements of a viewer, comprising the steps of:
determining the perceptual requirements of a viewer for a video image; and, varying the quality of the video image in dependence on the perceptual requirements.

In an embodiment the perceptual requirements are the size of the image. In embodiments the size is the location of the image with respect to the viewer.

In an embodiment the video image and the viewer are in a virtual environment and comprise the step of determining the orientation of the viewer with respect to the video image.

In embodiments of the invention, the method comprises the further step of determining the perceptual requirements of a viewer in dependence on the location and orientation of the viewer with respect to the video image and the quality of the image is varied such that the perceived quality of the image by the viewer is maintained as the viewer moves with respect to the image.

In embodiments of the invention, the video image and the viewer are in a virtual environment and the orientation of the viewer is with respect to the video image in the virtual environment.

In embodiments of the invention the video image is an image of a participant in a three dimensional video conferencing system.

In embodiments of the invention the video image is a video stream.

In embodiments of the invention the step of varying the quality of the image is performed by spatially degrading the image.

Embodiments of the invention include the additional step of calculating the spatial degradation of the image in dependence on the perceptual requirements of the viewer and applying the calculated spatial degradation to the image.

In embodiments of the invention, the degree of spatial degradation varies across the image.

Embodiments of the invention include the additional step of dividing the image into portions and applying spatial degradation to each portion based on the distortion of each portion as perceived by the viewer.

Embodiments of the invention include the step of varying the quality of the image in dependence on the distortion of the image as perceived by the viewer.

In embodiments of the invention the distortion is the change in perceived size of the portion.

In embodiments of the invention the distortion of a portion is calculated in dependence on at least one of:
a. Whether the portion is occluded;
b. The virtual distance between the viewer and the image; and,
c. distortion due to the angle portion is being viewed.

In embodiments of the invention the distortion is calculated by matrix transformation.

In embodiments of the invention degradation is performed by frequency masking.

In embodiments of the invention the method is performed in a multimedia environment and the steps of calculating and applying the spatial degradation of the image is performed at a server and the degraded image is transmitted to a client across a network for display.

In embodiments of the invention the method comprises the further step of using:
a. View field culling technique;
b. Visibility culling technique;
c. Back face culling technique; and/or,
d. Occlusion culling technique;
When determining the distortion of the image.

In embodiments of the invention the degradation is performed in the Discrete Cosine Transformation (DCT) domain by the process of DCT down sampling by setting a number of coefficients in the DCT domain to zero.

In embodiments of the invention the DCT down sampling method only requires inverse entropy coding.

A third aspect, the invention provides the quality of a displayed video image to meet the perceptual requirements of a viewer, comprising:

means for determining the location and orientation of a viewer with respect to a video image; and, means for varying the quality of the video image in dependence on the location and orientation of the viewer.

In a fourth aspect the invention provides an apparatus for controlling the quality of a displayed video image to meet the perceptual requirements of a viewer, comprising:

means for determining the perceptual requirements of a viewer for a displayed video image, and means for varying the quality of the video image in dependence on the perceptual requirements.

In embodiments the perceptual requirements are the size of the image to the viewer. Preferably the size is the location of the image with respect to the viewer.

In embodiments the video image and the viewer are in a virtual environment and means for determining the orientation of the viewer with respect to the video image. Further embodiments of the invention provide means for determining the perceptual requirements of a viewer in dependence on the location and orientation of the viewer with respect to the video image and means for varying the quality of the image such that the perceived quality of the image by the viewer is maintained as the viewer moves with respect to the image.

In embodiments of the invention the video image and the viewer are in a virtual environment and the orientation of the viewer is with respect to the video image in the virtual environment.

In embodiments of the invention the video image is an image of a participant in a three dimensional video conferencing system.

In embodiments of the invention the video image is a video stream.

In embodiments of the invention the means for varying the quality of the image varies the quality in dependence on the distortion of the image as perceived by the viewer.

In embodiments of the invention the quality of the image is varied by spatially degrading the image.

Embodiments of the invention further comprise means for calculating the spatial degradation of the image in dependence on the perceptual requirements of the viewer and means for applying the calculated spatial degradation to the image.

In embodiments of the invention the degree of spatial degradation varies across the image.

Embodiments of the invention further comprising means for dividing the image into portions and means for applying spatial degradation to each portion based on the distortion of each portion as perceived by the viewer.

In embodiments of the invention the distortion is the change in perceived size of the portion.

In embodiments of the invention the distortion of a portion is calculated in dependence on at least one of:
a. Whether the portion is occluded;
b. The virtual distance between the viewer and the image; and,
c. distortion due to the angle portion is being viewed.

In embodiments of the invention the distortion is calculated by matrix transformation.

In embodiments of the invention degradation is performed by frequency masking.

Embodiments of the invention operate in a multimedia environment and the means for calculating and applying the spatial degradation of the image is are located at a server and the degraded image is transmitted to a client across a network for display.

Embodiments of the invention further comprise use of:
a. View field culling technique;
b. Visibility culling technique;
c. Back face culling technique; and/or,
d. Occlusion culling technique;
When determining the distortion of the image.

In embodiments of the invention the degradation is performed in the Discrete Cosine Transformation (DCT) domain by the process of DCT down sampling by setting a number of coefficients in the DCT domain to zero.

In embodiments of the invention the DCT down sampling method only requires inverse entropy coding.

In embodiments the quality is varied by varying visual parameters of the video image. In embodiments the visual parameters include at least one of sharpness, brightness, colour, intensity, blurring.

BRIEF DESCRIPTION OF THE FIGURES

In order to achieve a better understanding of the nature of the present invention embodiments will now be described, by way of example only, with reference to the accompanying figures in which:

FIG. 2 is a schematic diagram of a system arranged for managing multimedia data in a virtual environment.

FIG. 7 shows rotation about local y axis (Beta).

DETAILED DESCRIPTION OF EMBODIMENTS OF THE INVENTION

Figure 1:
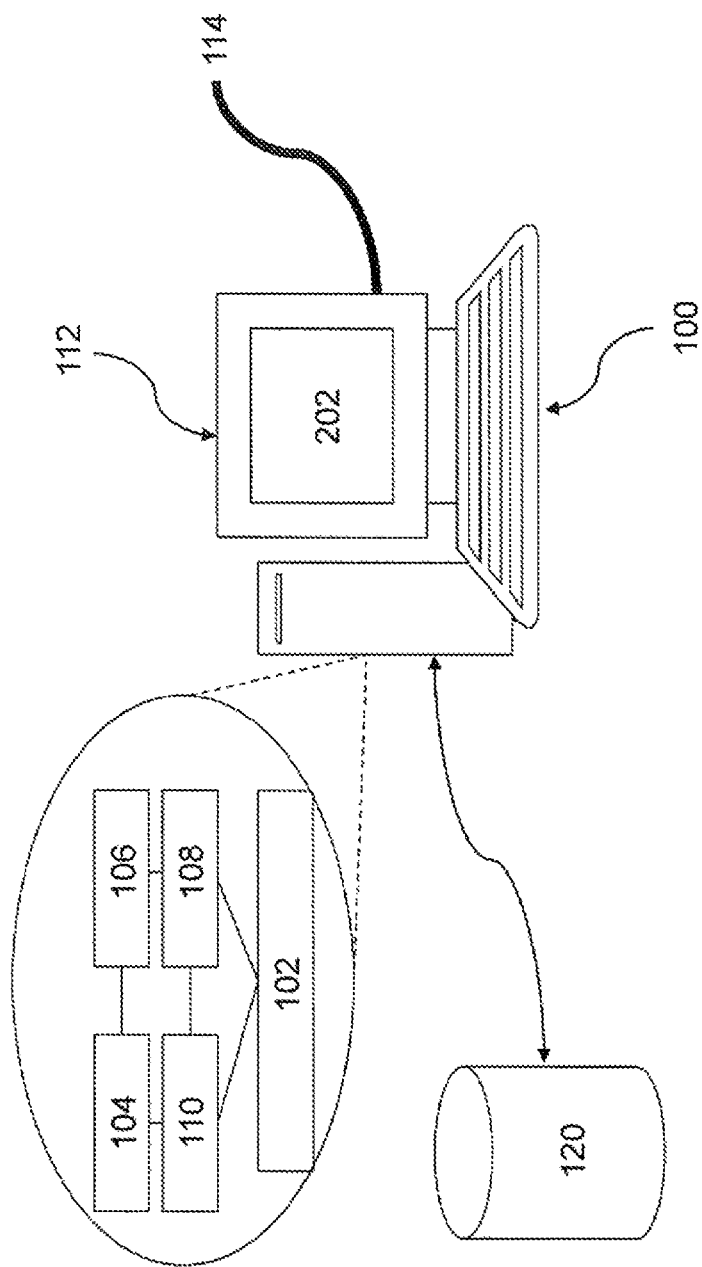
FIG. 1 is a schematic diagram of a general computing device upon which the system and method of the present invention may be implemented.

Referring to FIG. 1 there is a shown a schematic diagram of a general computing device 100. The computing device 100 comprises suitable components necessary to receive, store and execute appropriate computer instructions. The components may include a processing unit 102, read-only memory (ROM) 104, random access memory (RAM) 106, and input/output devices such as disk drives 108, input devices 110 such as an Ethernet port, a USB port, etc. Display 112 such as a liquid crystal display, a light emitting display or any other suitable display and communications links 114. The server 100 includes instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices. At least one of a plurality of communications link may be connected to an external computing network through a telephone line or other type of communications link.

The service may include storage devices such as a disk drive 108 which may encompass solid state drives, hard disk drives, optical drives or magnetic tape drives. The server 100 may use a single disk drive or multiple disk drives. The server 100 may also have a suitable operating system 116 which resides on the disk drive or in the ROM of the server 100.

The device may include a database 120 residing on a disk or other storage device which is arranged to store data. The database 120 is in communication with an interface 202, which is implemented by computer software residing on the computing device 100. The interface 202 provides a means by which to communicate with a human user. In the specification reference to servers, processors, clients, user devices or computing devices are implemented using a computing device 100 described earlier.

FIG. 2 shows a system diagram of a system for managing multimedia data. The system 200 includes a central server 201, at least one or more clients 202, a database 203 and a virtual environment 204 (described later). The system may comprise an optional media server 205. A communication network 206 allows communication between the various components of the system. The communication network may be any suitable network. The clients 202 and the central server 201 are implemented on a computing device 100 described earlier.

The clients 202 are adapted to communicate with the central server 201. The clients 202 are arranged to communicate with each other in the virtual environment 203 via the central server 201. The central server 201 creates the virtual environment and manages or controls the data flow to and from the virtual environment 204. The instructions regarding the contents of the virtual environment may be stored on the database 203, and can be accessed by the central server. In another form the system may include a further media server 205 that controls the media data sent to and from the virtual environment. The media server 205 is adapted to be in communication with the central server 201, and may in some forms be controlled by the central server. The media server 205 may be arranged to communicate with the database 203 also.

Figure 3A:
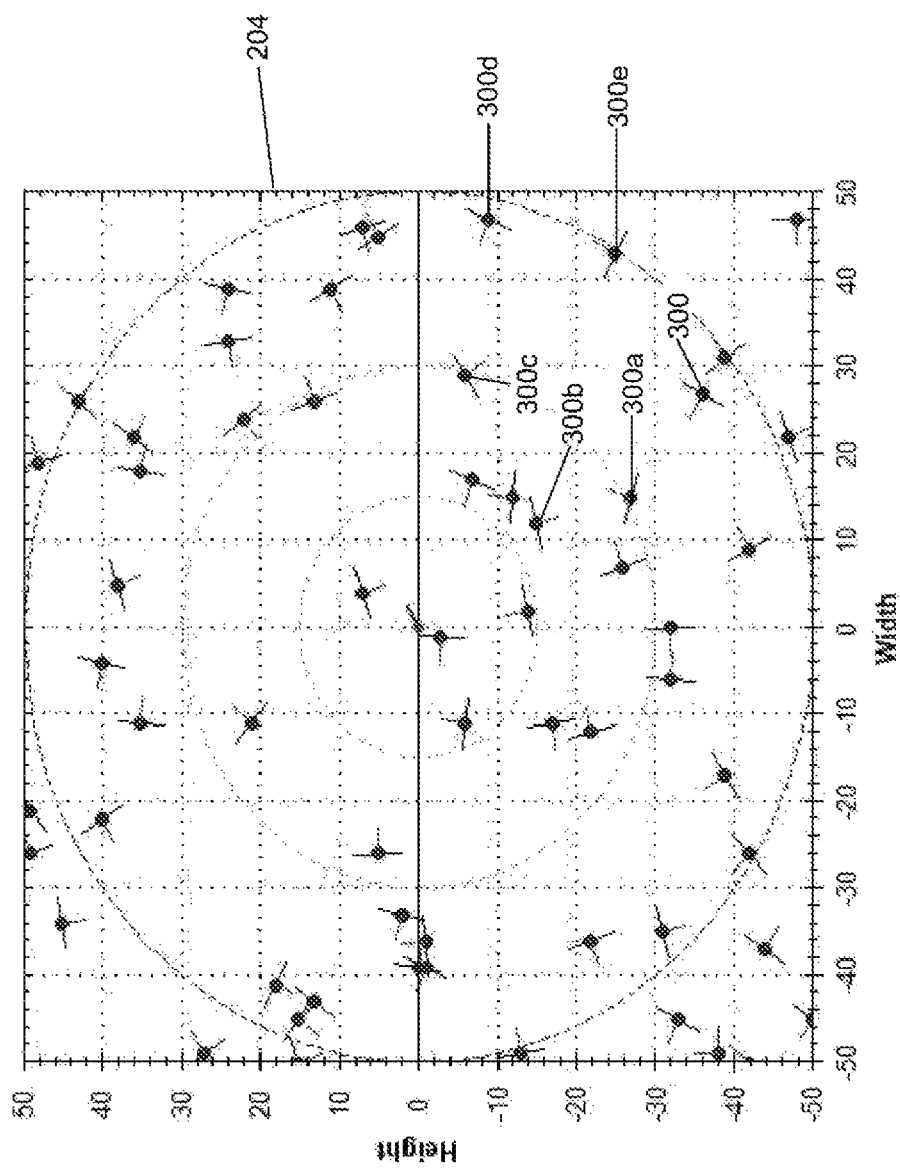
FIG. 3a is a schematic representation of a virtual environment with a plurality of avatars.

The central server 201 creates and manages a virtual environment 204. The virtual environment, in one form, is a 3D (three dimensional) environment adapted for video conferencing. FIG. 3a shows an image of the virtual environment with two avatars that each represent a corresponding client within the virtual environment. The figure shows a 2D (two dimensional) image of the virtual environment. There are a plurality of users and the users can interact with the virtual environment through the clients 202. The clients 202 may include a user interface such as a screen or display that allows a user to view the virtual environment and view and interact with other avatars in the virtual environment.

The database 203 stores instructions regarding the components of the virtual environment. The database may be arranged to store a plurality of different types of virtual environments. The database may include instructions or information regarding graphics, rendering, bounds, limits and objects that are common to all virtual environments. The database 203 can be accessed by the server 201 that uses information relating to a virtual environment to create the virtual environment 204. Once the virtual environment is created it can be populated with participants. The central server 201 receives information from the clients 202 that want to be positioned in the virtual environment as participants. The central server may process information from the database and the clients in order to create a virtual environment and populate the virtual environment with participants.

In another form the media server 205 receives instructions regarding creation of a virtual environment from the central server 201. The media server may access the database and use the stored information to create a virtual environment. The media server 205 may also receive instructions relating to the clients 202 from the central server 201. The media server 205 can process this information and populate the virtual environment with participants. In an alternate form the clients 202 may communicate with the media server 205 directly, the media server processing the information from the clients 202 and populating the virtual environment with participants. In this alternate form the media server may communicate directly with the database 203 to gather necessary information in order to create a virtual environment.

A networking system is illustrated in the Figures. The system illustrates a networking method that allows users to correspond with live video and audio streams.

The networking method comprises generating a virtual environment and populating the virtual environment with a plurality of avatars 300. The avatars 300 each represent a corresponding user. Each avatar 300 displays a video stream of the corresponding user that is displayed in the virtual environment. The avatars 300 also define a virtual view point from which the virtual environment is reproduced for the corresponding user.

Each user controls the movement of the corresponding avatar within the virtual environment. The movement of the avatars within the virtual environment is monitored by the central server 201. The server 201 also captures a media stream from the virtual view point of each avatar as users navigate the virtual environment. The captured media stream is displayed to the user on a corresponding local client (such as the user's personal computer).

The server 201 determines a location orientation and angle of line-of-sight of each avatar with respect to each other within the virtual environment. The media stream displayed to the corresponding user is generated based on the location, orientation and angle of line-of-sight for the corresponding avatar. The server 201 may construct the media stream for each avatar using techniques that are disclosed later in this specification.

The server 201 ideally determines a virtual distance between avatars within the virtual environment. The virtual distance may be used to moderate the quality of the video stream relayed to a user's local client. One factor in the quality of an avatar's video stream (as reproduced in the media stream of another avatar) is based on the proximity of the respective avatars within the virtual environment. The server 201 may reduce the bit rate and/or frame rate of the reproduced video stream for distant avatars to moderate the video stream quality.

The server 201 may generate a virtual display screen that displays images sourced from a client (associated with an avatar within the virtual environment) in the virtual environment. The virtual display screen being visible within the virtual environment.

The illustrated networking system comprises a server that hosts a virtual environment and a plurality of user avatars stored in server memory. The server 201 is connected to a data network. The avatars are accessible through the data network. Each user avatar displays a video stream of a corresponding user. Typically, the video screen will display the output from the video camera associated with by the client in the video conference. The avatars also define a virtual view point that dictates the perspective of the virtual environment that is relayed to a corresponding user. The server 201 documents movement of the avatars within the virtual environment and defines a media stream that is captured from the virtual view point of each avatar. The media stream is relayed to a corresponding user.

The server 201 determines a line-of-sight for each avatar within the virtual environment. The line-of-sight defines the media stream that is relayed to the corresponding user. The server 201 may direct the transmission of the video stream associated with each avatar (based on the corresponding line-of-sight) directly between clients associated with the avatars. Alternatively, the server 201 may receive the video stream associated with each avatar and relay the media stream for each avatar to a corresponding user's local client. This increases the bandwidth loading on the server 201 (as the server 201 receives a full video stream for each user client), but reduces the bandwidth loading on the individual clients (as the local clients only receive the video stream for other avatars that are within their line-of-sight).

Figure 3B:
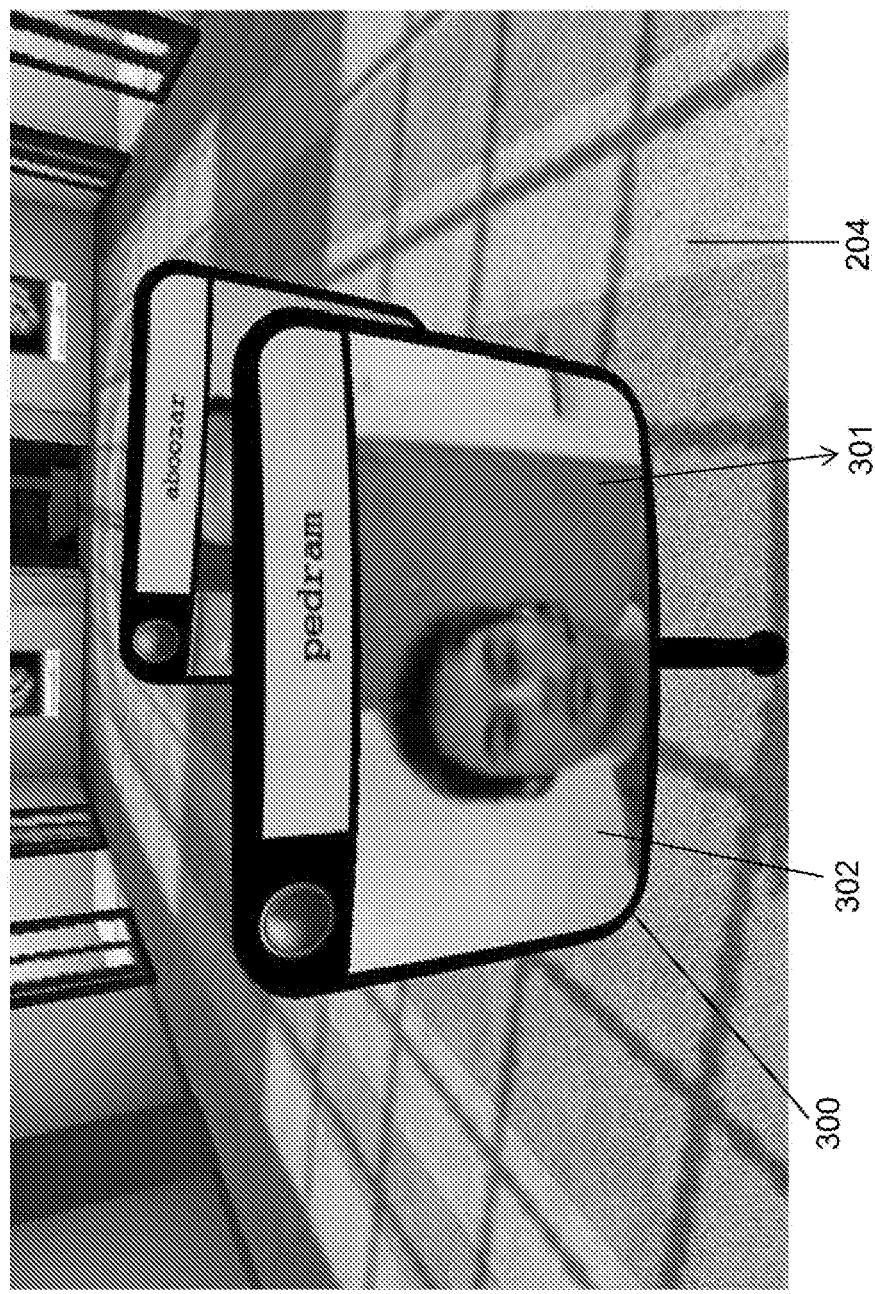
FIG. 3b shows one form of an avatar in the virtual environment.

The virtual environment may include a plurality of avatars 300a, 300b, 300c, 300d, etc. as seen in FIG. 3a. Each one of the avatars exist in the environment in the form of a simplified visual representation of the user. The avatar may take any suitable form and may be customisable to allow a user to create their own avatar. As shown in FIG. 3b, the avatar 301 includes a display 302. The display in one form is a live video feed. The video feed can be recorded and streamed live from a video recording device such as a camera that may be associated with the client 202. The video stream is transmitted to the central server 201 and then projected into the virtual environment as part of the avatar. In another form the video stream may be sent by the server 201 to the media server 205 which then transmits the information to the avatar in the virtual environment 204.

The clients 202 may be able to communicate with the virtual environment in order to control the avatar 300 associated with the client. The user can control the motion of the avatar 300 in the virtual environment. Avatars can move freely within the virtual environment and an avatar can interact with other avatars. The illustrated avatars display a corresponding user's multimedia data feed. Users can therefore communicate with other users in the virtual environment through their respective avatars. A user can speak directly to another user via the multimedia data feed of the other user's avatar.

The avatars also include a virtual camera 303 that receives multimedia data from other avatars. The multimedia data streams are transmitted either to the media server or the central server and then transmitted back to the end user associated with the avatar 300. The camera 302 allows the end user to view the virtual environment and the avatars of other users, and receive communication from the other users in the virtual environment through their respective avatars. The multimedia data stream can involve video and audio data, or simply video data or simply audio data.

Figure 3C:
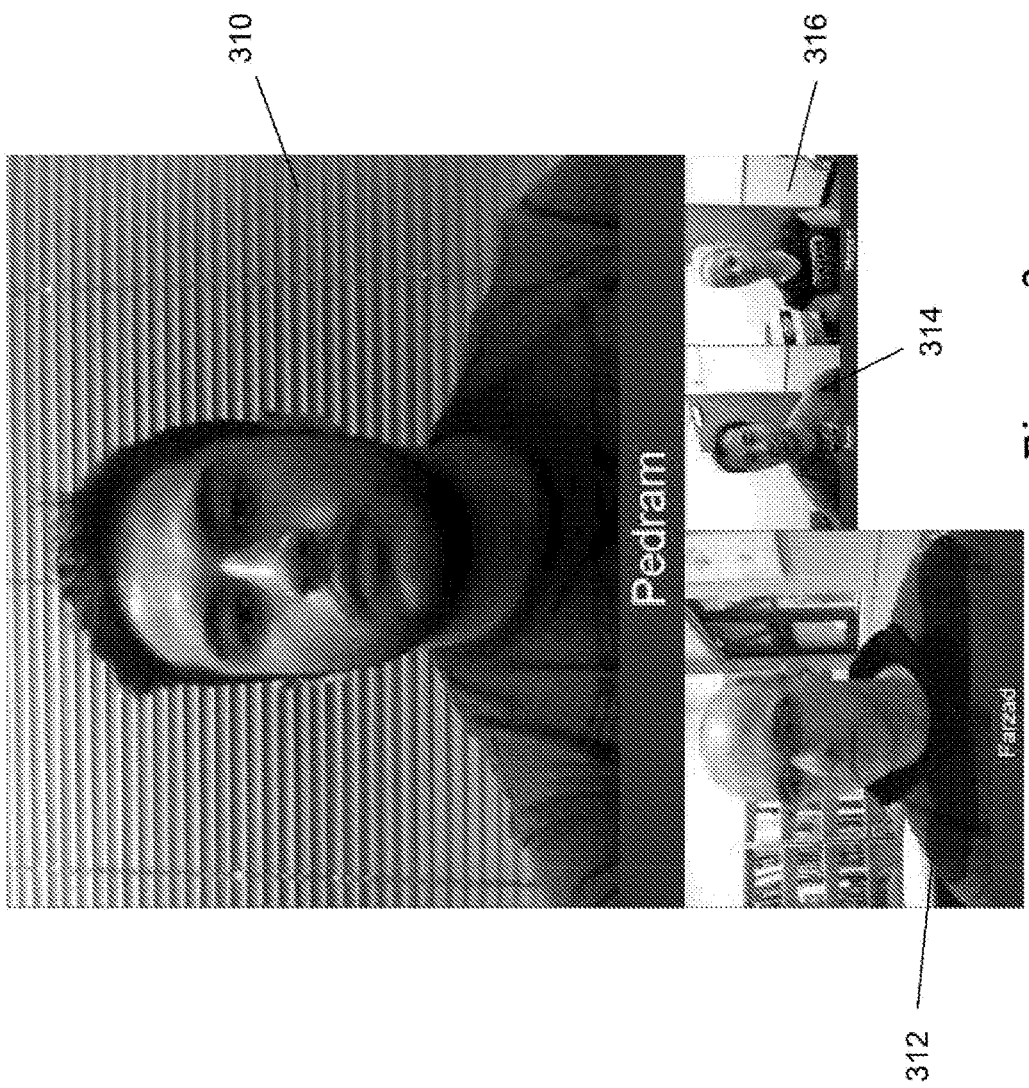
FIG. 3c shows one form of a plurality of avatars in the virtual environment.

In a second form, the virtual environment is a 2D (two dimensional) environment adapted for video conferencing. FIG. 3c shows an image of a virtual environment including multiple users where the users can interact with the environment through clients 202. The clients 202 may include a user interface such as a screen or display that allows a user to view the virtual environment and view and interact with other avatars in the virtual environment.

As discussed above with respect to FIGS. 3a and 3b the database 203 stores instructions regarding the components of the virtual environment. Database 203 can be accessed by server 201 that uses information relating to the virtual environment to create the virtual environment. In FIG. 3c each avatar displays a video stream of the corresponding user that is displayed in the virtual environment. In the example of FIG. 3c a plurality of rectangular avatars 310 312 314 316 exist in the form of a video representation of the user. In FIG. 3c the avatars are displayed as tiles within a single block video image. The avatars have different sizes.

Figure 3D:
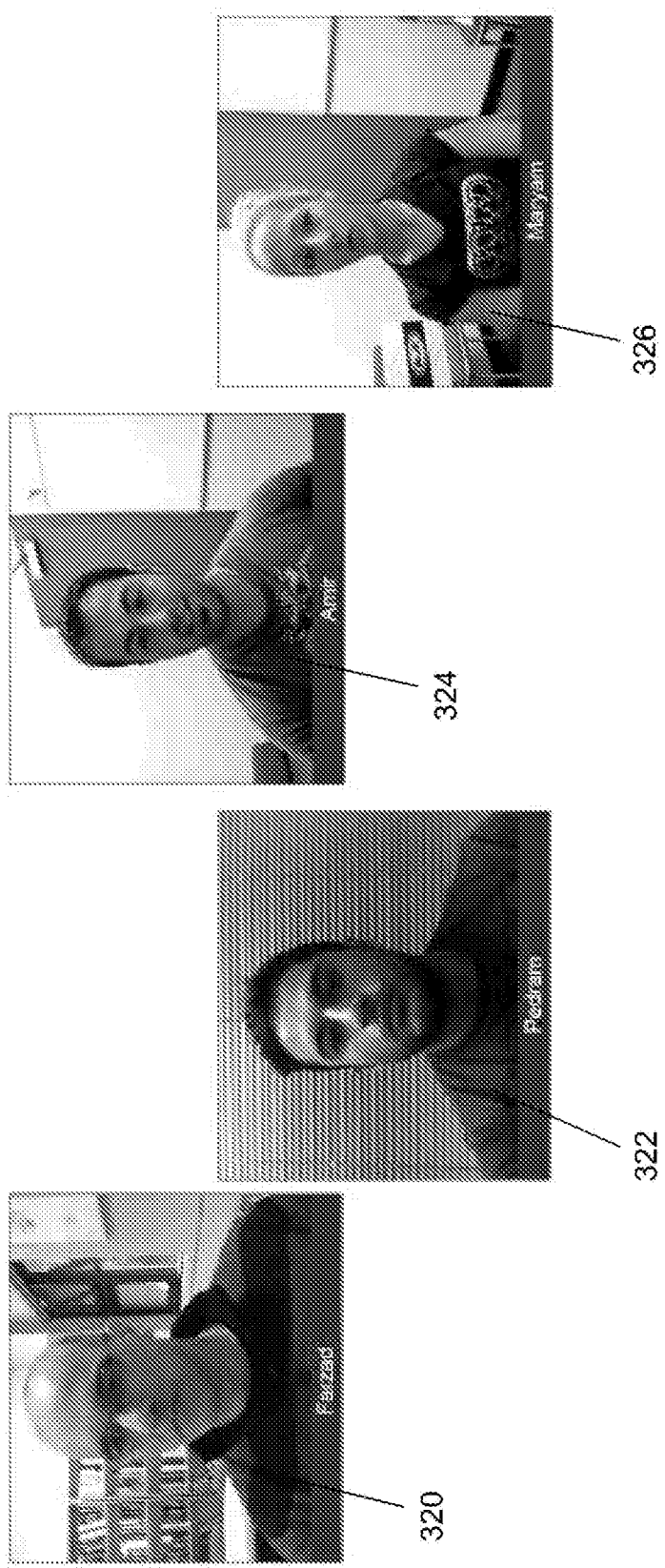
FIG. 3d shows one form of a plurality of avatars in the virtual environment.

FIG. 3d shows a further environment adapted for video conferencing. In FIG. 3d each avatar displays a video stream of the corresponding user that is displayed in the virtual environment. In the example of FIG. 3d a plurality of avatars 320 322 324 326 exist in the form of a video representation of the user. In FIG. 3d the avatars are displayed as individual rectangular 2D images spatially arranged across the virtual environment. The avatars are all arranged at the same angular orientation facing directly out of the virtual environment.

Figure 13:
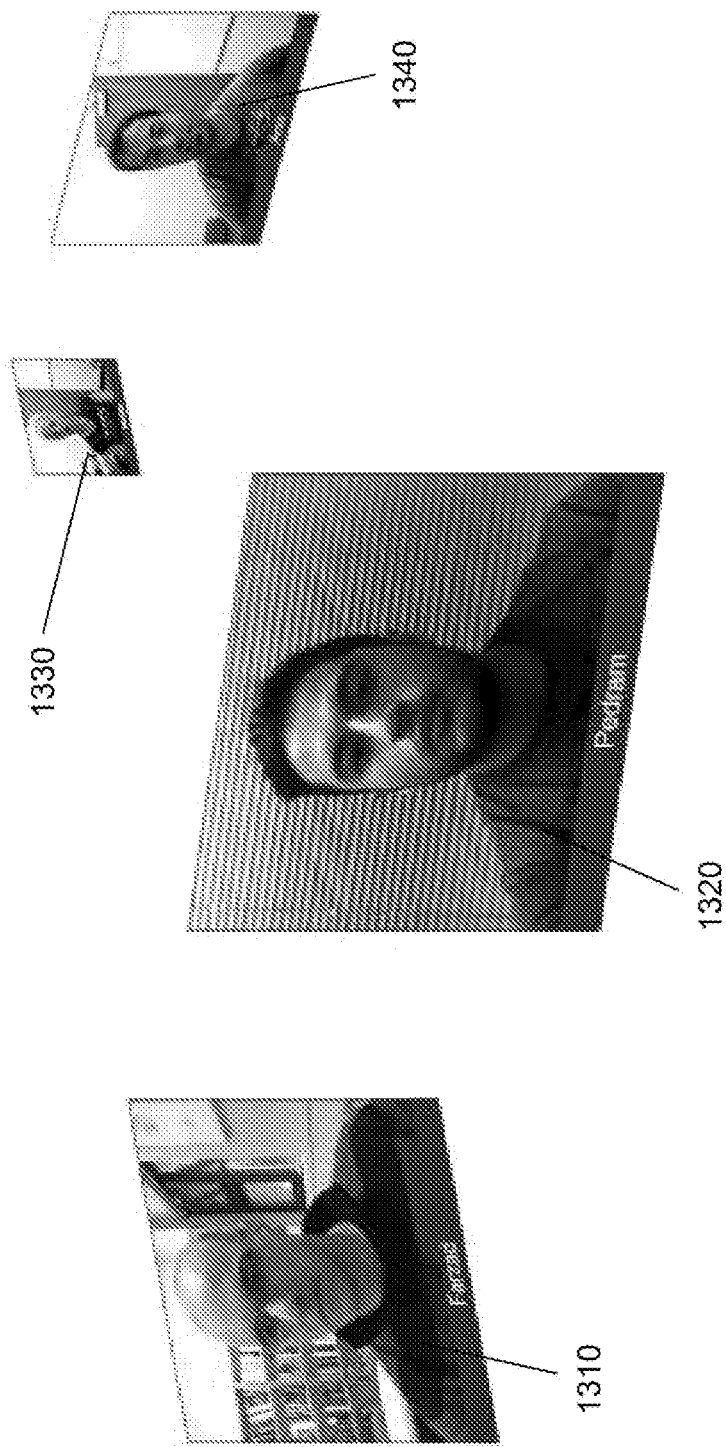
FIG. 13 shows one form of a plurality of avatars in the virtual environment.

FIG. 13 shows a further environment adapted for video conferencing. In FIG. 13 each avatar displays a video stream of the corresponding user that is displayed in the virtual environment. In the example of FIG. 13 a plurality of avatars 1310 1320 1330 1340 exist in the form of a video representation of the user. In FIG. 13 the avatars are displayed as individual images spatially arranged across the virtual environment. The avatars are arranged at different angular orientations within the virtual environment. The avatars have different sizes.

In the specification the word avatar relates to a virtual representation of a user in the virtual environment. The avatar is an electronic representation of a user that can communicate with the network and system components described earlier. Where ever there is reference to an avatar performing an action it will be understood it is the client associated with that avatar that is performing that action in the physical world.

Figure 4A:
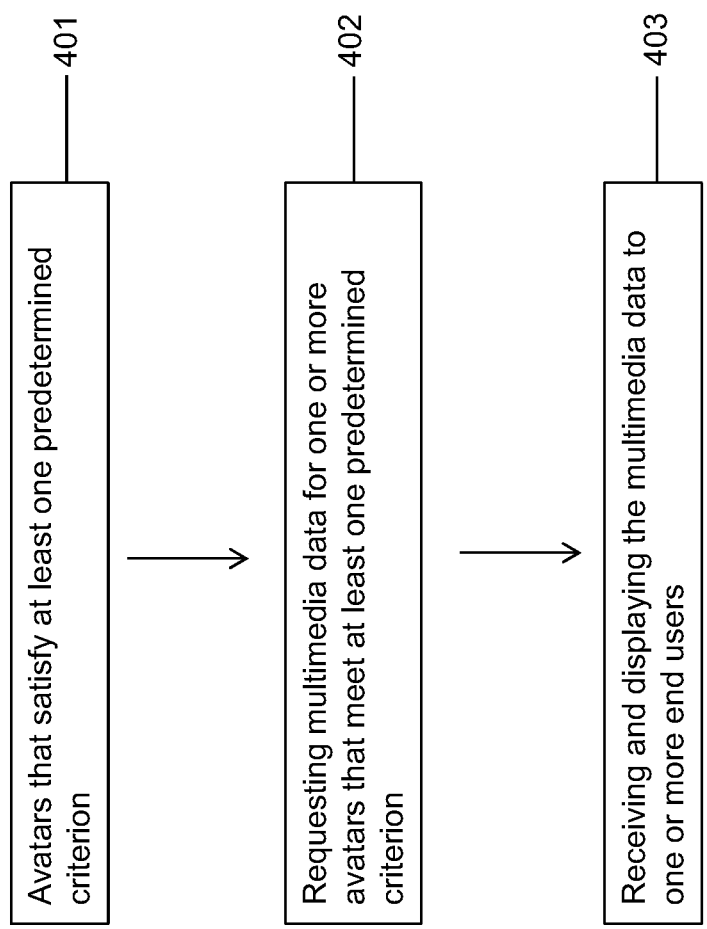
FIG. 4a is a flow chart that shows a general method of managing multimedia data in a virtual environment as implemented by a client.

FIG. 4a shows a method for managing multimedia data in a virtual environment. This method is ideally implemented on each individual client 202. The method comprises the steps of:
 i. determining one or more avatars that satisfy at least one pre-determined criterion defined for an end user, at step 401;
 ii. requesting multimedia data for the one or more avatars that meet the at least one predetermined criterion, at step 402; and
 iii. receiving and displaying the multimedia data to the end user, at step 403.

Figure 4B:
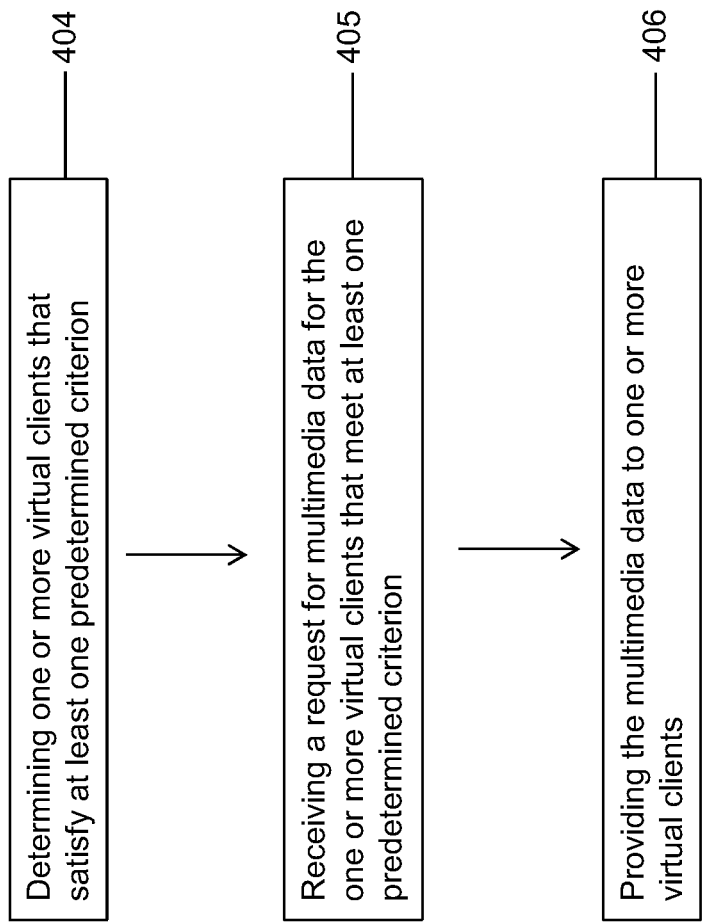
FIG. 4b is a flow chart that shows a general method of managing multimedia data in a virtual environment as implemented by a central server.

FIG. 4b shows another method for managing multimedia data in a virtual environment. This method may be implemented by the central server 201 or the media server 205. The method comprises the steps of:
 i. determining one or more avatars that satisfy at least one predetermined criterion defined for an end user, at step 404;
 ii. receiving a request for multimedia data for the one or more avatars that meet at least one pre-determined criterion, at step 405; and
 iii. providing the multimedia data to one or more end users, at step 406.

The pre-determined criterion specified in both methods may include at least one data culling technique applied to one or more of the avatars in the virtual environment.

Possible data culling techniques include:
 (a) a view field culling technique;
 (b) a visibility culling technique;
 (c) a back face culling technique; and/or
 (d) an occlusion culling technique.

Examples of possible data culling techniques are already described in the applicant's patent application WO 2013/003914. The view field culling technique includes defining a view field for each avatar. Each avatar 300 includes a view field which is defined in a coded set of rules. The rules regarding the size of the view field can be modified and altered by an authorised person such as an administrator. These rules may be stored on the database, or the central server 201 or the media server 205.

Figure 5:
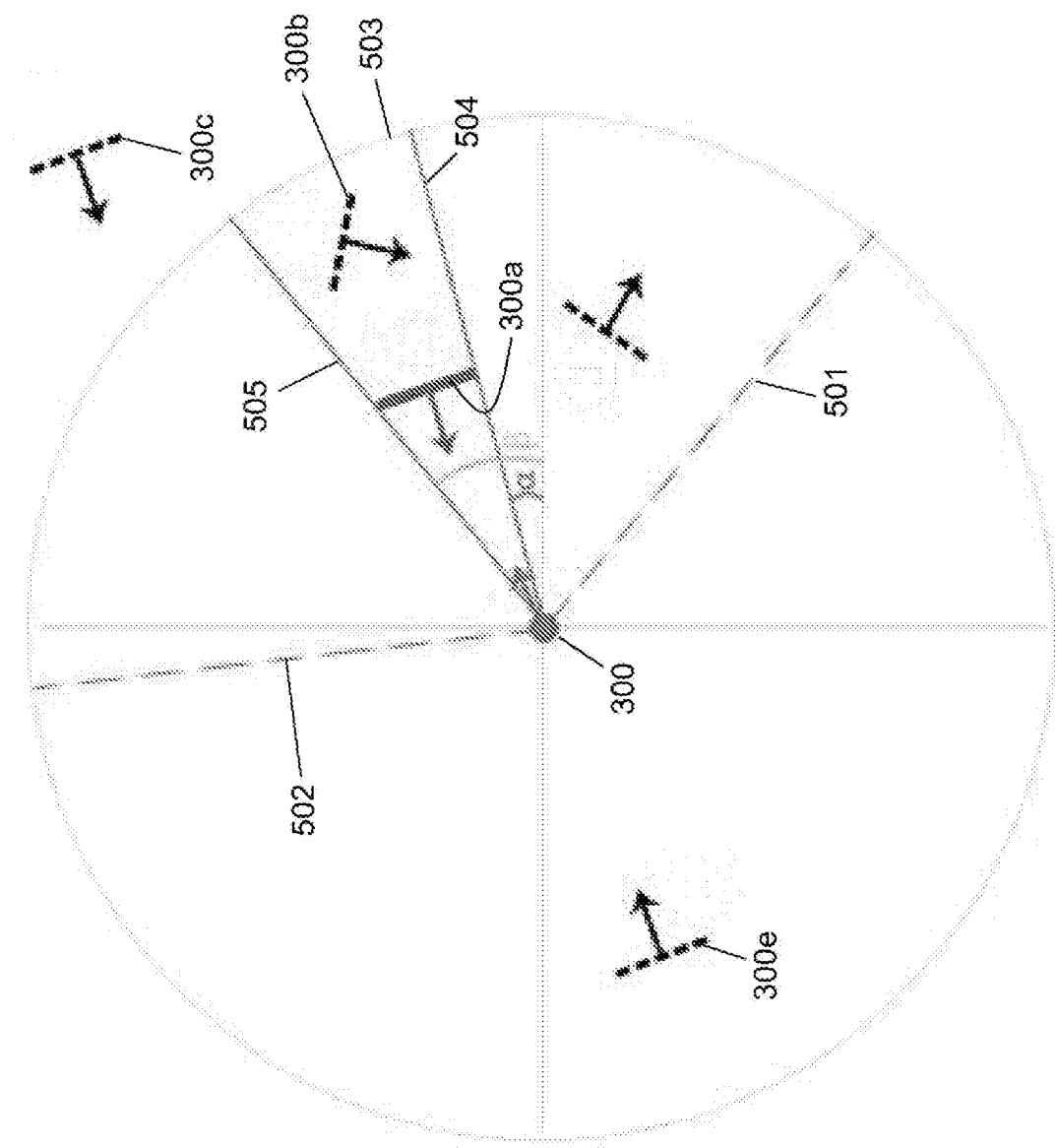
FIG. 5 shows an example view field of a avatar and shows other avatars in and out of the view field.
Figure 6:
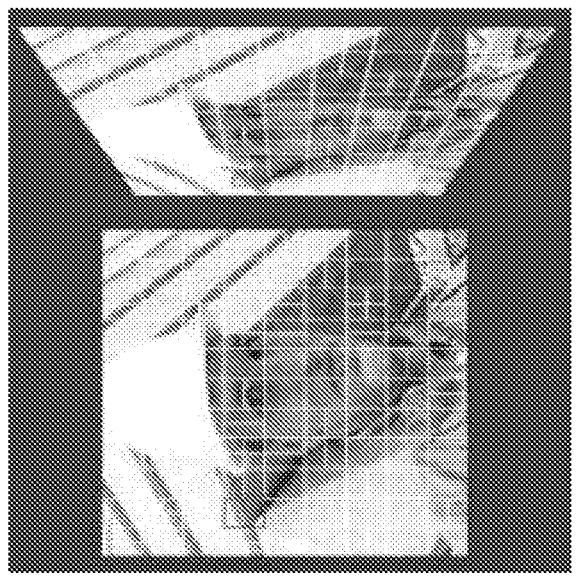
FIG. 6 shows the projected size of the macroblocks after 60 degree rotation about local y axis.

FIG. 5 shows an example of a view field of an avatar. The view field 500 can take any suitable geometric shape. The edges 501, 502 of the shape define the limits of the avatar's view field (which corresponds to the view of the virtual environment relayed to the respective end user). FIG. 6 shows a view field in the shape of a triangle (when viewed from above in two dimensions).

The view field may be any other suitable shape that extends outwardly from the avatars. For example, the view field may be a diverging shape originating at the avatar 300. The maximum visibility range is defined by the edge 503 of the view field.

In one form the central server 201 determines the location information of each one of the avatars in the virtual environment. The central server 201 may also determine the orientation of the avatars relative to the other avatars. The central server 201 can transmit this information to the clients such that the clients are aware of the location and orientation of the other avatars in the virtual environment. In an alternate form the individual clients may determine the orientation of other avatars within the virtual environment. The client may also determine the position of the other avatars within the virtual environment.

Certain view field culling techniques include the step of excluding or culling avatars that are outside the view field 500 of the local avatar. As seen in FIG. 5, avatars 300d and 300e are outside the view field 500, and hence the multimedia data from these avatars (300d, 300e) are not delivered to the client associated with the local avatar 300. This results in a reduction of total bandwidth usage due to a reduced amount of multimedia data being transmitted across the network 206.

The visibility culling technique includes the step of excluding all the avatars that are located beyond the maximum range of visibility. If an avatar 300c is outside the maximum visibility range of the local avatar 300, then the multimedia data for the avatar outside the visibility range is not delivered to the local avatar 300, reduces the total bandwidth requirement.

The back culling technique involves the step of excluding avatars that have their back facing the local avatar 300. The local avatar 300 uses orientation information to determine which avatars are facing away (i.e. the orientation of the other avatar relative to the local avatar). If another avatar (for example, avatar 300d) is facing away from the local avatar 300, then the video data of the back facing avatar is not required by the client associated with the local avatar 300. As seen from FIG. 5, avatar 300d is facing away from the avatar 300, hence the multimedia data of avatar 300d is not supplied to avatar 300, thereby reducing the bandwidth requirement across the network because less video data is being transmitted over the network.

The occlusion culling technique involves the step of determining which avatars are covered by other avatars from the perspective of a local avatar. If an avatar is fully occluded or partially occluded by an object within the virtual environment or another avatar, then video data for the occluded avatar is not delivered to the client associated with the local avatar. As can be seen from FIG. 5, the angle of the occlusion lines 504 and 505 (lines that emanate from the view point and extend to the extremities of the occluding avatar to define the 'shadow' created by the occluding avatar in the local avatar's view field) are calculated ($\alpha$ and $\beta$) for each avatar. The angle from $\alpha$ to $\beta$ is termed the avatar's blocking angle range. This angle defines the part of the local avatars view that is blocked due to another avatar being present in the view field. From the nearest avatar to the furthest avatar, an overlap test is applied to check if the blocking ranges of avatars result in any overlap within the total visible angle range of the local avatar. Each avatar's blocking angle range is first compared to the blocked area. If there is any overlap, then further testing needs to be done to determine avatar priority (based on proximity to the local avatar), otherwise it is assumed that the avatar is visible. Finally, the angle range is added to the blocked area.

FIG. 5 shows that avatar 300b is completely occluded by avatar 300a. Since avatar 300b is occluded, the multimedia data of avatar 300b is not delivered to the client associated with avatar 300 because avatar 300 does not have a line of sight to avatar 300b in the virtual environment.

Applying these data culling techniques results in a reduction of the amount of data sent to each client and hence reduces the bandwidth requirements of the network. The data culling techniques only allows multimedia data of avatars that are "visible" to a local avatar to be sent to the corresponding client. The implementation of this data culling techniques simulates "real life" interaction in the virtual environment, meaning the local avatar does not see other avatars that are occluded (either by other avatars or objects within the virtual environment) facing away, or outside a defined field on view (such as behind the local avatar).

Each client may maintain a list of visible avatars and requests multimedia data relating to the visible avatars. The visible avatars are determined by applying one or more of the data culling techniques described earlier. In one form the client requests multimedia data for visible avatars from the central server 201. The central server 201 gathers multimedia data from all the avatars and only sends multimedia data for the identified visible avatars. In another form the client for a local avatar requests multimedia data from other clients that relate to visible avatars.

The applicant has appreciated that the perceptual requirements of an image by an avatar, or viewer also vary depending on the current perspective of the viewer to the image. As the viewer moves from a face to face viewing of the image to viewing at an angle, the applicant has identified that the quality of parts of the image can be degraded without producing any reduction in the perceived quality of the image. This technique of varying the quality of the image is referred to in this specification as 'pruning'.

It will be clear that the perceptual requirements of an image by an avatar are also applicable in an environment in which images are static in orientation and displayed facing out of the virtual environment, as shown in the examples of FIGS. 3c and 3d. The images may be different sizes. In such environments the viewing angle is perpendicular to the face of the image. The perceptual requirements are also applicable in an environment in which images are positioned at different angles as shown in the example of FIG. 3e. In the ongoing discussion references to 3D environment should also encompass environments in which images are provided at different sizes and angular orientations.

We now describe the process of pruning an image or video stream displayed on an avatar. Preferably, pruning will be performed on the video stream after the culling calculations have been performed in order to most efficiently handle processing, for example so that additional data processes are not executed as a part of an image that is back facing and not visible to the viewer.

Overview of Perceptual Pruning

The following is a summary of main requirements for immersive video conferencing (IVC) video pruning:

1—It is desirable for the source to produce one video stream (the best quality). The recipients need to receive a 'pruned' version of this stream that exactly matches the perceptual requirement of their rendered video according to the current perspective of the viewer.

2—The process of pruning should take place in the coded domain as much as possible. Because decoding the stream and encoding it again, whether it is done in a server or by a peer, is very expensive and will limit the scalability.

3—The pruning process should have fine granularity with respect to levels of quality degradation (and the subsequent bit rate savings) that can be achieved.

4—The pruning process should also have very detailed control on the location of degradation that is introduced, as different parts of an image may require different levels of degradation.

5—Ideally, the same process of pruning should be used for all different kinds of degradation that may be required. This is despite the fact that the cause of quality degradation may be different, for example, occluded regions, reduced resolution due to virtual distance or distortion due to orientation angles.

We now described an embodiment of the proposed 'perceptual pruning' process that satisfies all of these requirements. In the present embodiment, the perceptual pruning process will be applied after the culling process described above to further improve the network capacity utilisation. The pruning process is informed by the result of the extensive user study on the perceptual impact of video quality degradation and will not lead to any perceived quality reduction. The process described below is tailored to the current common practice in video coding technology, which divides the image into a number of blocks (typically 8×8 or 4×4 pixel blocks) although other variations are possible. The quality degradation is applied to each block based on the location, orientation or occlusion status of the block. The basic steps of the algorithm are listed below and the details are presented in the next section:

1—An efficient mathematical formulation is used to calculate the location and orientation of each video block in the rendered window.

2—Informed by the results of the user study, the level of required quality degradation is determined based on the location of the block as calculated above.

3—A number of coefficients in the Discrete Cosine Transform (DCT) domain will be set to zero using a suitable mask to match the required quality. This is referred to as DCT down sampling. Given that the pruning is done in the DCT domain, there is no need to completely decode the video and encode again. The only step that may be required is to do the inverse entropy coding which is computationally light.

4—The number of coefficients set to zero varies based on the required quality level, from 'all zeros' used for occluded blocks (which would have been rendered black if visible) to no masking to get the full resolution.

5—The pruned stream is then entropy coded and sent to the recipient which will decode and render as normal. No additional overhead and no modification of the decoder is required.

6—The pruning can take place in the server or in the source client (for P2P scenario) and should be done for each recipient independently. However, if two or more recipients have very similar perspectives of a client, then the same stream may be used for all.

7—The predicted frames of a video (P and B frames) must have the same pruning process as their corresponding reference frames (e.g. I frame). So any changes in perspective that requires modification of pruning mask will be applied at the next Group of Picture (GoP). To avoid any discrepancy between the required resolution and the pruning mask, a conservative pruning mechanism is exploited, which predicts the highest required resolution for the whole interval based on the future three dimensional states.

The next Section provides more details about the key steps of the process following by the experimental results.

Rendering and Terminology

The video frames are applied as textures to the front surface of avatars known as video surface. The process of mapping texture from texture space to screen space is divided into two phases. Initially, texture is mapped from texture space to object space and then the modelling and view transformations map object space to screen space usually by exploiting a perspective projection. The pixel in texture is called texel. Due to the perspective projection, multiple texels may be projected to a single pixel or oppositely a texel may be projected to many pixels on the screen. If the ratio of texel to pixel is greater than one, then it is called texture minification; otherwise it is called texture magnification. Different texture filtering mechanisms are developed to determine the contribution of texels in screen pixels in order to convolute the texels with a filter to achieve the final pixel. This embodiment aims to take advantage of texture minification and magnification to minimise the required network capacity for transmission of video data with no or negligible perceptual impact. The perceptual pruning mechanism is performed on the server side to degrade video quality of avatars with respect to their three dimensional positions and orientations to the camera eye. Since video data is transmitted to the clients and video frames are used as textures, the proposed method is based on video macroblocks. In the process of degradation the projected size of each macroblock is calculated and based on the projected size, a degradation mechanism is applied. To avoid the expensive computation of decoding of video data, a DCT down-sampling method is proposed that only requires inverse entropy coding. The method is computationally cheap and saves significant amount of bandwidth consumption in a crowded IVC.

Block Projection Calculation

Modern video codecs, like H.264/AVC use the notion of macroblock partition to refer to the group of pixels in a block that share a common prediction. Basically encoders use search methods to determine suitable motion vectors and compare the rate-distortion score for possible macroblock partitioning e.g. 16×16, 16×8, 8×8, 4×4 microblocks, such that the video coding performance is optimised. In traditional video conferences, the video is always received by the viewer in a perfect rectangular shape. However, in IVC as the result of three dimensional presentation of avatars and perspective projection, the video surface may be distorted. This distortion is usually not uniform and some macroblocks in the frame may be squeezed (texture minification) while others may be stretched (texture magnification) (FIG. 6). The main goal of this research is to calculate the projected size of each block on the server and discard unnecessary information. Therefor in the proposed method rather than up-sampling or down-sampling the whole frame, using the achieved mathematical model the projected size of macroblocks are calculated and each block is treated independently.

Transformation

The objective in this section is to develop a method to calculate the size of each block of the video frame based on the relative virtual location and orientation of the avatar.

Definitions

We use coordinate frames and suppose that we have an origin $\phi$ and three mutually perpendicular axes in the direction of i, j and k. The position of each avatar is defined by point p which represents the position of the centre point of the graphical presentation of the avatar in the three dimensional environment from the origin. Point p in the frame is given by P=$\phi$+Px i+Py j+Pz k and so the homogeneous presentation of p is:

$$\tilde{P} = \begin{pmatrix} P_x \\ P_y \\ P_z \\ 1 \end{pmatrix}$$

Although in IVC the avatars are free to move and rotate, it is assumed that the avatars are only allowed to rotate about the local y axis (The axis goes through the centre of the avatar aligns with the global y axis). However, the mathematical model achieved can easily be extended for the other axes as described in the section.

All surfaces align with the xy plane has the zero y euler angle. The angle of the video surface denotes by $\beta$ and the positive values of $\beta$ cause a clockwise (CW) rotation about the local y axis as one looks inward from a point on the axis toward the avatar (FIG. 7).

Three Dimensional Affine Transformations

Affine transformations are the cornerstone of computer graphics and they are widely used. Any transformation can be produced by four elementary transformations: 1—a translation, 2—a scaling, 3—a rotation and 4—a shear and a succession of affine transformations can easily be combined into a single overall affine transformation.

Suppose T( ) is an affine transformation that transforms point $\tilde{P}$ to point $\tilde{Q}$. Then T( ) is represented by a 4 by 4 matrix called $\tilde{M}$.

$$\tilde{M} = \begin{pmatrix} m_{11} & m_{12} & m_{13} & m_{14} \\ m_{21} & m_{22} & m_{23} & m_{24} \\ m_{31} & m_{32} & m_{33} & m_{34} \\ 0 & 0 & 0 & 1 \end{pmatrix}$$

And $\tilde{Q}$ can be achieved by multiplying $\tilde{P}$ by matrix $\tilde{M}$:

$$\begin{pmatrix} Q_x \\ Q_y \\ Q_z \\ 1 \end{pmatrix} = \tilde{M} \begin{pmatrix} P_x \\ P_y \\ P_z \\ 1 \end{pmatrix}$$

The elementary three dimensional transformations

Here the elementary transformations are analysed individually.

Translation:

The translation of an object in the three dimensional environment into a different position is simple:

$$\begin{pmatrix} 1 & 0 & 0 & m_{14} \\ 0 & 1 & 0 & m_{24} \\ 0 & 0 & 1 & m_{34} \\ 0 & 0 & 0 & 1 \end{pmatrix}$$

Thus point $\tilde{P}$ is simply translated in $\tilde{Q}$ by the vector m=(m14, m24, m34).

Scaling:

A scaling changes the size of an object and involves three scale factor for the x, y and z coordinates respectively:

$$\begin{pmatrix} s_x & 0 & 0 & 0 \\ 0 & s_y & 0 & 0 \\ 0 & 0 & s_z & 0 \\ 0 & 0 & 0 & 1 \end{pmatrix}$$

Note that the scaling is about the origin.

Shearing:

A shear along the x axis is the one that the y and z value each of point is unaffected, whereas each x value is translated by an amount that increases linearly with y and/or z. The matrix for the simplest shear is the identity matrix with one zero replaced with a value.

$$\begin{pmatrix} 1 & 0 & 0 & 0 \\ f & 1 & 0 & 0 \\ 0 & 0 & 1 & 0 \\ 0 & 0 & 0 & 1 \end{pmatrix}$$

Rotation:

In order to simplify a rotation in three dimensions, the rotations are decomposed to the simpler ones around the coordinate axes.

The matrices that produce the rotation about x, y and z axis are presented below. In each of them the rotation is through angle $\beta$ about the given axis. The positive angle is defined by a looking inward convention (FIG).

The following matrices present transformations that rotate point p through angle $\beta$ about an axis. The suggestive notation Rx( ), Ry( ) and Rz( ) are used to denote rotations about x, y and z respectively. The angle parameter is given in radian and c stands for $\cos(\beta)$ and s for $\sin(\beta)$.

$$R_x(\beta) = \begin{pmatrix} 1 & 0 & 0 & 0 \\ 0 & c & -s & 0 \\ 0 & s & c & 0 \\ 0 & 0 & 0 & 1 \end{pmatrix}$$

$$R_y(\beta) = \begin{pmatrix} c & 0 & s & 0 \\ 0 & 1 & 0 & 0 \\ -s & 0 & c & 0 \\ 0 & 0 & 0 & 1 \end{pmatrix}$$

$$R_z(\beta) = \begin{pmatrix} c & -s & 0 & 0 \\ s & c & 0 & 0 \\ 0 & 0 & 1 & 0 \\ 0 & 0 & 0 & 1 \end{pmatrix}$$

Object Coordinates are the coordinates of the object (Avatar) relative to the centre of the model The Model transformation is applied to each model to transform it into World Coordinates.

Model Transformation:

Suppose that two transformations are represented by matrices $\tilde{M}_1$ and $\tilde{M}_2$. Thus P is first transformed to $\tilde{M}_1 P$ and then transformed to $\tilde{M}_2(\tilde{M}_1 P)$ By associativity this is just $(\tilde{M}_2 \tilde{M}_1)P$. Thus the overall transformation can be represented by a single matrix $$\tilde{M} = \tilde{M}_2 \tilde{M}_1$$

When homogeneous matrices are used, composing affine transformation is achieved by a simple matrix multiplication. Note that the order of the matrices are reverse order to that the transformations are applied.

Blocks:

In IVC each frame of the video is assigned to a video surface as a texture. On the other hand, the video codec divides each frame to n blocks with arbitrary sizes with respect to the content of the video.

The spatial location of block m is defined by $x_m$, $y_m$, $w_m$ and $h_m$, where $x_m$, is the distance of top left corner of block m from the left side of the frame in pixel and $y_m$, is the distance of the top left corner of the block from the top side. $w_m$ and $h_m$ also represent the width and height of the block in pixel respectively. The size of the image in pixel is also fixed and denotes by $w_i$ and $h_i$.

Avatars:

If size of the avatar based on the three dimensional world's units is represented by A, then $A_x$, $A_y$ and $A_z$ are width, height and thickness of the avatar respectively.

Calculating the Block Position:

In this approach, the relative block position to the avatar, when the avatar is located on the origin is calculated then the avatar is translated to its position. Hence the block is translated to its relative position so calculating the centre position of block m, when the avatar is located at x, y and z with angle of $\beta$ can be achieved by the following elementary transformations:

Translate point P through vector $$v2 = \left( \frac{\left(\frac{w_i}{2} - x_m - \frac{w_m}{2}\right)}{w_i} A_x, \frac{\left(\frac{-h_i}{2} + y_m + \frac{h_m}{2}\right)}{h_i} A_y, -\frac{A_z}{2} \right)$$

Rotate about the y axis through angle $\beta$;

Translate back point p through vector v3=(x, y, z);

Create a matrix for each elementary transformation and multiply them to produce an overall matrix:

$$\begin{pmatrix} 1 & 0 & 0 & x \\ 0 & 1 & 0 & y \\ 0 & 0 & 1 & z \\ 0 & 0 & 0 & 1 \end{pmatrix} \begin{pmatrix} c & 0 & s & 0 \\ 0 & 1 & 0 & 0 \\ -s & 0 & c & 0 \\ 0 & 0 & 0 & 1 \end{pmatrix} \begin{pmatrix} \frac{\left(\frac{w_i}{2} - x_m - \frac{w_m}{2}\right)}{w_i} A_x \\ \frac{\left(\frac{-h_i}{2} + y_m + \frac{h_m}{2}\right)}{h_i} A_y \\ -\frac{A_z}{2} \\ 1 \end{pmatrix}$$

And the overall matrix is:

$$\begin{pmatrix} x - \frac{A_z s}{2} + A_x c \frac{\frac{w_m}{2} - \frac{w_i}{2} + x_m}{w_i} \\ y - A_y \frac{\frac{h_m}{2} - \frac{h_i}{2} + y_m}{h_i} \\ z - \frac{A_z c}{2} - A_x s \frac{\frac{w_m}{2} - \frac{w_i}{2} + x_m}{w_i} \end{pmatrix}$$

Thus X, Y and Z as the position of the centre of the block m can be achieved by the following formulas:

$$X = x - \frac{A_z s}{2} + A_x c \frac{\frac{w_m}{2} - \frac{w_i}{2} + x_m}{w_i}$$

$$Y = y - A_y \frac{\frac{h_m}{2} - \frac{h_i}{2} + y_m}{h_i}$$

$$Z = z - \frac{A_z c}{2} - A_x s \frac{\frac{w_m}{2} - \frac{w_i}{2} + x_m}{w_i}$$

In order to calculate the position of the corners a slight modification is needed. For instance by replacing the $$\frac{w_m}{2} \text{ and } \frac{h_m}{2}$$

with zero the global (world) position of the top left corner of the block can be calculated. Likewise position of the bottom right corner of the block can be achieved by replacing $$\frac{w_m}{2} \text{ and } \frac{h_m}{2}$$

with $w_m$ and $h_m$ respectively.

View:

World Coordinates are the coordinates of the object relative to the world origin. The View transformation is applied to each block in the world to transform it into Eye Coordinates. Eye Coordinates are the coordinates of the blocks relative to the camera.

View Transformation:

Since IVC in this research is a distributed system and each avatar is viewing the world from its perspective, the blocks' position should be calculated from each of the avatars viewing point independently.

Furthermore, the local avatar might not be located on the origin and hence the calculation should be extended to meet this requirement. To solve this issue, the whole coordinate system is moved to the local avatars position and rotated to be aligned with the viewer's angle. If the position of the local avatar is represented by $x_0$, $y_0$ and $z_0$ and its orientation with $\alpha_0$, $\beta_0$ and $\gamma_0$ then in the overall view transformation will be:

Rotate about the z axis through angle $-\gamma_0$;
Rotate about the y axis through angle $-\beta_0$;
Rotate about the x axis through angle $-\alpha_0$;
Translate back point p through vector $v_4 = (-x_0, -y_0, -z_0)$;

The view matrix can be constructed by multiplication of the primary matrices:

$$V = \begin{pmatrix} \cos(\gamma_0) & \sin(\gamma_0) & 0 & 0 \\ -\sin(\gamma_0) & \cos(\gamma_0) & 0 & 0 \\ 0 & 0 & 1 & 0 \\ 0 & 0 & 0 & 1 \end{pmatrix} \begin{pmatrix} \cos(\beta_0) & 0 & -\sin(\beta_0) & 0 \\ 0 & 1 & 0 & 0 \\ \sin(\beta_0) & 0 & \cos(\beta_0) & 0 \\ 0 & 0 & 0 & 1 \end{pmatrix}$$

$$\begin{pmatrix} 1 & 0 & 0 & 0 \\ 0 & \cos(\alpha_0) & \sin(\alpha_0) & 0 \\ 0 & -\sin(\alpha_0) & \cos(\alpha_0) & 0 \\ 0 & 0 & 0 & 1 \end{pmatrix} \begin{pmatrix} 1 & 0 & 0 & -x_0 \\ 0 & 1 & 0 & -y_0 \\ 0 & 0 & 1 & -z_0 \\ 0 & 0 & 0 & 1 \end{pmatrix}$$

Since camera is attached to the local avatar and only rotation about local y axis is allowed, then the overall view matrix can be simplified by replacing $\alpha_0$ and $\gamma_0$ with zeros. Hence the overall view matrix is as follows:

$$V = \begin{pmatrix} \cos(\beta_0) & 0 & -\sin(\beta_0) & z_0\sin(\beta_0) - x_0\cos(\beta_0) \\ 0 & 1 & 0 & -y_0 \\ \sin(\beta_0) & 0 & \cos(\beta_0) & -z_0\cos(\beta_0) - x_0\sin(\beta_0) \\ 0 & 0 & 0 & 1 \end{pmatrix}$$

Perspective Projection:

The perspective projection is exploited to transform the calculated positions of the blocks from the eye coordinates into their pixel coordinates on the 2D screen. By looking at the graphics pipeline, we demonstrate the idea of projecting a block on the screen (FIG. 8).

Figure 8:
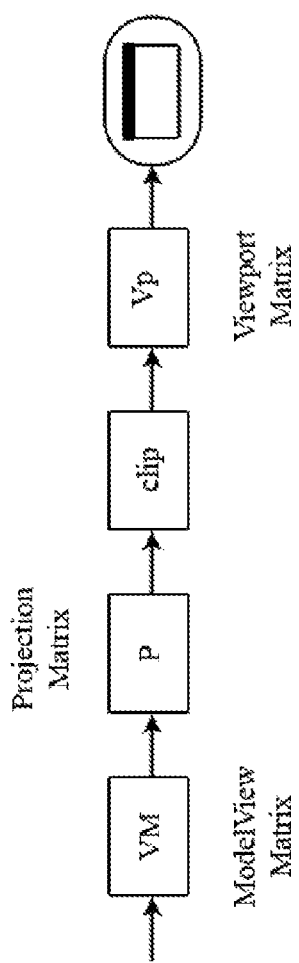
FIG. 8 shows the graphics pipeline.
Figure 9:
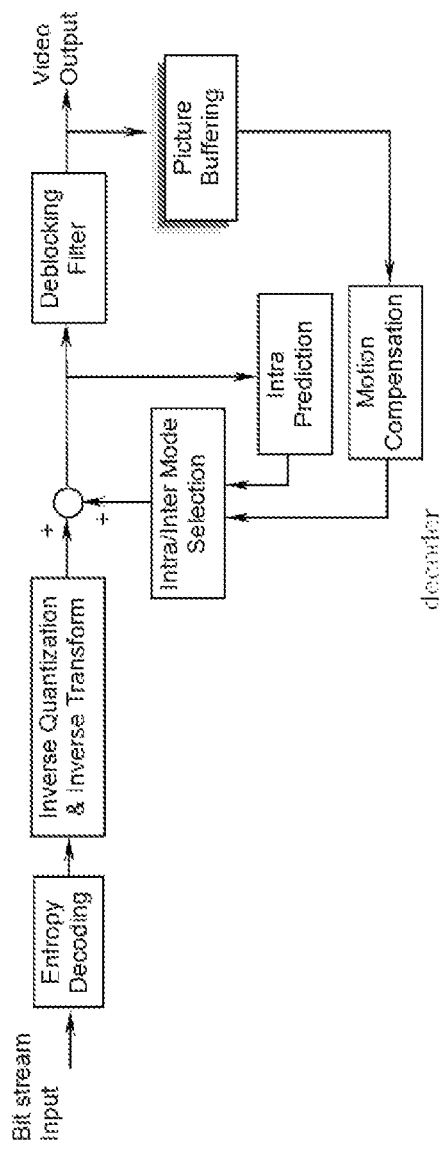
FIG. 9 shows the decoding diagram.
Figure 10:
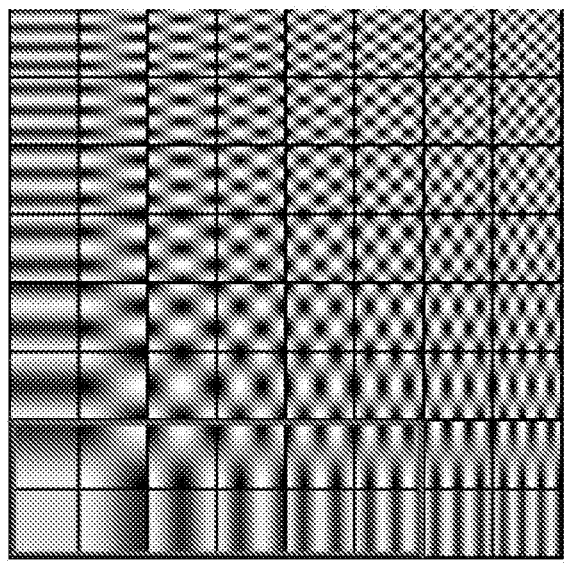
FIG. 10 shows the DCT down sampling process.
Figure 11:
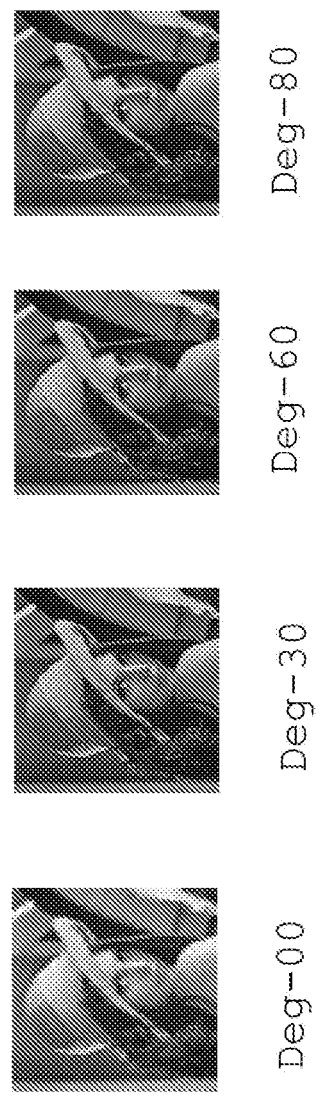
FIG. 11 shows perceptual pruning for various virtual orientations (2D presentation).

As demonstrated in FIG. 8, each block is passed through this pipeline and the block is multiplied by the various matrices and then clipped if necessary and if it survives it ultimately maps on the screen.

As shown in the pipeline the modelling and viewing transformation can be replace by a single Model View matrix, which is in fact the product of model and view matrices (VM).

$$VM = \begin{pmatrix} \cos(\beta)\cos(\beta_0) + \sin(\beta)\sin(\beta_0) & 0 & \cos(\beta_0)\sin(\beta) - \cos(\beta)\sin(\beta_0) & A \\ 0 & 1 & 0 & B \\ \cos(\beta)\sin(\beta_0) - \sin(\beta)\cos(\beta_0) & 0 & \cos(\beta_0)\cos(\beta) + \sin(\beta)\sin(\beta_0) & C \\ 0 & 0 & 0 & 1 \end{pmatrix}$$

$$A = z_0\sin(\beta_0) - x_0\cos(\beta_0) +$$

$$\cos(\beta_0)\left(x - \frac{A_z\sin(\beta)}{2} + A_x\cos(\beta)\frac{\frac{w_m}{2} - \frac{w_i}{2} + x_m}{w_i}\right) +$$

-continued $$\sin(\beta_0)\left(\frac{A_z\cos(\beta)}{2} - z + A_x\sin(\beta)\frac{\frac{w_m}{2} - \frac{w_i}{2} + x_m}{w_i}\right)$$

$$B = y - y_0 - A_y\frac{\frac{h_m}{2} - \frac{h_i}{2} + y_m}{h_i}$$

$$C = \sin(\beta_0)\left(x - \frac{A_z\sin(\beta)}{2} + A_x\cos(\beta)\frac{\frac{w_m}{2} - \frac{w_i}{2} + x_m}{w_i}\right) - x_0\sin(\beta_0) -$$

$$z_0\cos(\beta_0) - \cos(\beta_0)\left(\frac{A_z\cos(\beta)}{2} - z + A_x\sin(\beta)\frac{\frac{w_m}{2} - \frac{w_i}{2} + x_m}{w_i}\right)$$

The projection matrix scales and translates each block in a way, so that all the blocks locating inside the view frustum bounded by near and far clipping planes with the angle fovy will lie in a standard cube that extends from −1 to 1 in each dimension. After applying the perspective division step, the blocks in normalised device coordinates are multiplied by the view port matrix and transformed to the window coordinates. Then a simple mapping process maps the values to pixel coordinates.

$$P = \begin{pmatrix} \frac{1}{asp \times \tan(fovy)} & 0 & 0 & \\ 0 & \frac{1}{\tan(fovy)} & 0 & \\ 0 & & -\frac{far+near}{far-near} & -\frac{2\times far\times near}{far-near} \\ 0 & & -1 & 0 \end{pmatrix}$$

Where fovy is the vertical viewing angle of the camera and asp is the aspect ratio, which controls the horizontal viewing angle relative to the vertical viewing angle. In other words fovx=asp×fovy. near and far represent the inverted z coordinates of the near and far clipping planes respectively.

Degradation Process:

As it will be discussed later, the projected size of the blocks may be smaller than their actual sizes due to the virtual distance and/or orientation of the video surface. The hypothesis of this research is that the blocks with smaller projected sizes comparing to their actual sizes require lower spatial resolution at that exact three dimensional situation. In other words, the spatial resolution of each block can be adjusted according to the projected size of the block on the screen. Nevertheless, this process is supposed to be performed on the server side and blocks are actually video frames' macroblocks. Spatial degradation of a frame requires decoding the whole frame followed by an encoding process which would be computationally expensive and cause additional delay. Hence, a DCT down sampling method is proposed that only involves partial decoding of the frame. In the degradation process only the entropy decoding is performed and image data in frequency domain is retrieved. Then the projected size of each block based on the three dimensional situation of the video surface and camera is calculated and all the coefficients that lie outside of the projected boundaries are replaced with zeros.

Justification of the Method:

To achieve the spatial degradation, a frequency masking method is proposed that accomplishes the goal with negligible computation and delay. In the proposed method, the projected size of each block is calculated and the vertical and horizontal frequencies outside of the projected boundaries are zeroed out. The hypothesis of the research is that when the block is projected to a smaller size, only the frequencies in that range are visually perceivable. Hence, if an 8×8 block is projected to 6×2 block only the DCT coefficients in the region are maintained and the rest is replace by zeros.

In the first experiment, a 512×512 reference image (Lena) is first degraded spatially in pixel domain and then degraded based on a simple frequency masking method in the frequency domain and the results are compared. The degradation in pixel domain is achieved by replacing the average value of every 4 (2×2) adjacent pixels to one pixel, hence width and height of the achieved image are half of the original size (256×256). On the other hand, after calculating the DCT coefficients of 8×8 blocks of the image, only 4×4 left top (DC component and low AC frequencies) components are reserved and the rest are discarded. Since the spatial size of the image is half the original size, the DCT coefficients are quantised accordingly (divided by 2) and the inverse DCT is obtained and the 256×256 image is constructed.

The results show that the achieved images have minor errors and they are very close in terms of perceptual quality.

TABLE 1

| object assessment of degraded image | | |
|---|---|---|
| MSE | PSNR | SSIM |
| 3.8309 | 42.3318 | 0.9886 |

However, in IVC the projection of each block is calculated and the frequency masking is applied based on the projected sizes and the DCT coefficients are not discarded but replaced with zeros. Hence the achieved frame size is same as the original frame size (512×512), while the bitrate is significantly reduced (especially I frames). Moreover, the conducted user study shows that up sampling the degraded frames to the original size and applying them as textures are perceptually preferred.

Experimental Results

In order to analyse the impact of perceptual pruning method, a controlled IVC environment has been setup, in which the general three dimensional specifications of the system for all experiments are fixed (refer to Details of the experiments) and then the performance of the method in terms of perceptual quality and bandwidth saving is studied.

To simplify the experiments, the studies are done using an image, which can represent the effect of the method on I-Frames. Thus, Lena's image is perceptually pruned for particular three dimensional situations as will be discussed later. The pruned image is then applied as a texture on the video surface and PSNR and similarity index of the degraded image comparing to the reference image in the exact same three dimensional situation is calculated. The objective assessment results are given to demonstrate the performance of the method in terms of perceptual quality. On the other hand, the percentage of zero DCT coefficients with respect to the total number of coefficients in each experiment is demonstrated as an indicator of potential improvement of required network capacity.

Details of the Experiments

In the following experiments, the IVC window has a fixed resolution of 1152×864 pixels. The camera is located at the origin and its view frustum is aligned with the z axis. The near and far clipping planes are located at 0.3, 1000 m respectively and camera has a 60 degree vertical viewing angle (fovy) with aspect ratio of 4:3. Size of the video surface is configured in a way that its projection on the screen at 1 m distance (0,0,1) from the camera eye is exactly 512×512 pixels.

Virtual Distance

In the first experiment, the reference image is pruned for different virtual distances from the camera. Since the projection of the video surface at 1 meter virtual distance to the camera and the actual size of the reference image are 512×512 pixels. The perceptual pruning method does not degrade the image at this particular three dimensional situation. However, this experiment is repeated for 2, 3, 4 and 5 m distance from the camera, which is achieved by changing the z value of the video surface respectively. To show the impact of the proposed method, the reference image and degraded image are first compared out of IVC (Table 2 and 3) and then applied as textures and compared in the corresponding three dimensional situations.

Since video codecs, usually divides frames into 8×8 or 4×4 macroblocks, the experiments are run for both situations.

TABLE 2 the comparison of degraded image and the
reference image out of IVC with 4 × 4 macroblocks

| distance | MSE | PSNR | SSIM |
|---|---|---|---|
| 1 | 0 | inf | 1 |
| 2 | 36.5714 | 32.5334 | 0.881 |
| 3 | 36.5714 | 32.5334 | 0.881 |
| 4 | 120.6549 | 27.3493 | 0.7225 |
| 5 | 120.6549 | 27.3493 | 0.7225 |

TABLE 3 the comparison of degraded image and the
reference image out of IVC with 8 × 8 macroblocks

| distance | MSE | PSNR | SSIM |
|---|---|---|---|
| 1 | 0 | inf | 1 |
| 2 | 29.4984 | 33.4668 | 0.8913 |
| 3 | 53.1827 | 30.9071 | 0.8307 |
| 4 | 98.1433 | 28.2462 | 0.7469 |
| 5 | 98.1433 | 28.2462 | 0.7469 |

For each case, the reference image and degraded image are transmitted to IVC and applied on the video surface separately, and then the video surface with the corresponding texture is extracted from the rendered scene. The results are compared by calculating the PSNR and ssim values (table 4 and 5).

TABLE 4 the comparison of degraded image and the
reference image inside IVC with 4 × 4 macroblocks

| Distance | MSE | PSNR | SSIM |
|---|---|---|---|
| 1 | 0 | inf | 1 |
| 2 | 2.6985 | 43.8535 | 0.991 |
| 3 | 1.0113 | 48.1159 | 0.9972 |
| 4 | 0.6132 | 50.2885 | 0.9985 |
| 5 | 0.9278 | 48.4902 | 0.9982 |

TABLE 5 the comparison of degraded image vs the
reference image inside IVC with 8 × 8 macroblocks

| distance | MSE | PSNR | SSIM |
|---|---|---|---|
| 1 | 0 | inf | 1 |
| 2 | 3.4856 | 42.742 | 0.9889 |
| 3 | 7.2412 | 39.5667 | 0.9835 |
| 4 | 3.7252 | 42.4533 | 0.9919 |
| 5 | 7.0978 | 39.6535 | 0.9887 |

The outcomes confirm that the frame (image) can be degraded based on the projected size of the block, which is dependant to the position of the video surface in this particular experiment. As demonstrated in Table 4 and 5, 4×4 partitioning of the frame has a better perceptual quality in IVC. This behaviour is the result of DCT down sampling method that zeros out the coefficients out of projected boundaries. Since the blocks are smaller, the DCT coefficients in a block represent a smaller spatial region of the frame (image) and even in the maximum degradation case, the average value of the entire pixels lie in the block is still maintained, which causes a better perceptual quality. However, there is a trade-off between quality and bitrate. Smaller partitions restrict the number of coefficients that can be zeroed out. For instance the maximum degradation, when the block size is 8×8 happens when only the DC component is kept and other 63 AC components are replaced with zeros, while this amount is decreased to 15 coefficients in the case of 4×4 block.

The number and percentage of zero coefficients for different virtual distances, which suggest the amount of required network capacity is demonstrated in the following table.

TABLE 6

The number and percentage of zero coefficients vs
non zero coefficients for various virtual distances

| | | No. zeros(8 × 8) | | No. zeros(4 × 4) | | Percentage (8 × 8) | | Percentage (4 × 4) | |
|---|---|---|---|---|---|---|---|---|---|
| Dis | No. Coef | before | after | before | after | before | after | before | after |
| 1 | 262144 | 213 | 213 | 3229 | 3229 | 0.081253 | 0.081253 | 1.231766 | 1.231766 |
| 2 | 262144 | 213 | 196610 | 3229 | 196759 | 0.081253 | 75.00076 | 1.231766 | 75.0576 |
| 3 | 262144 | 213 | 225282 | 3229 | 196759 | 0.081253 | 85.93826 | 1.231766 | 75.0576 |
| 4 | 262144 | 213 | 245760 | 3229 | 245760 | 0.081253 | 93.75 | 1.231766 | 93.75 |
| 5 | 262144 | 213 | 245760 | 3229 | 245760 | 0.081253 | 93.75 | 1.231766 | 93.75 |

Figure 15:
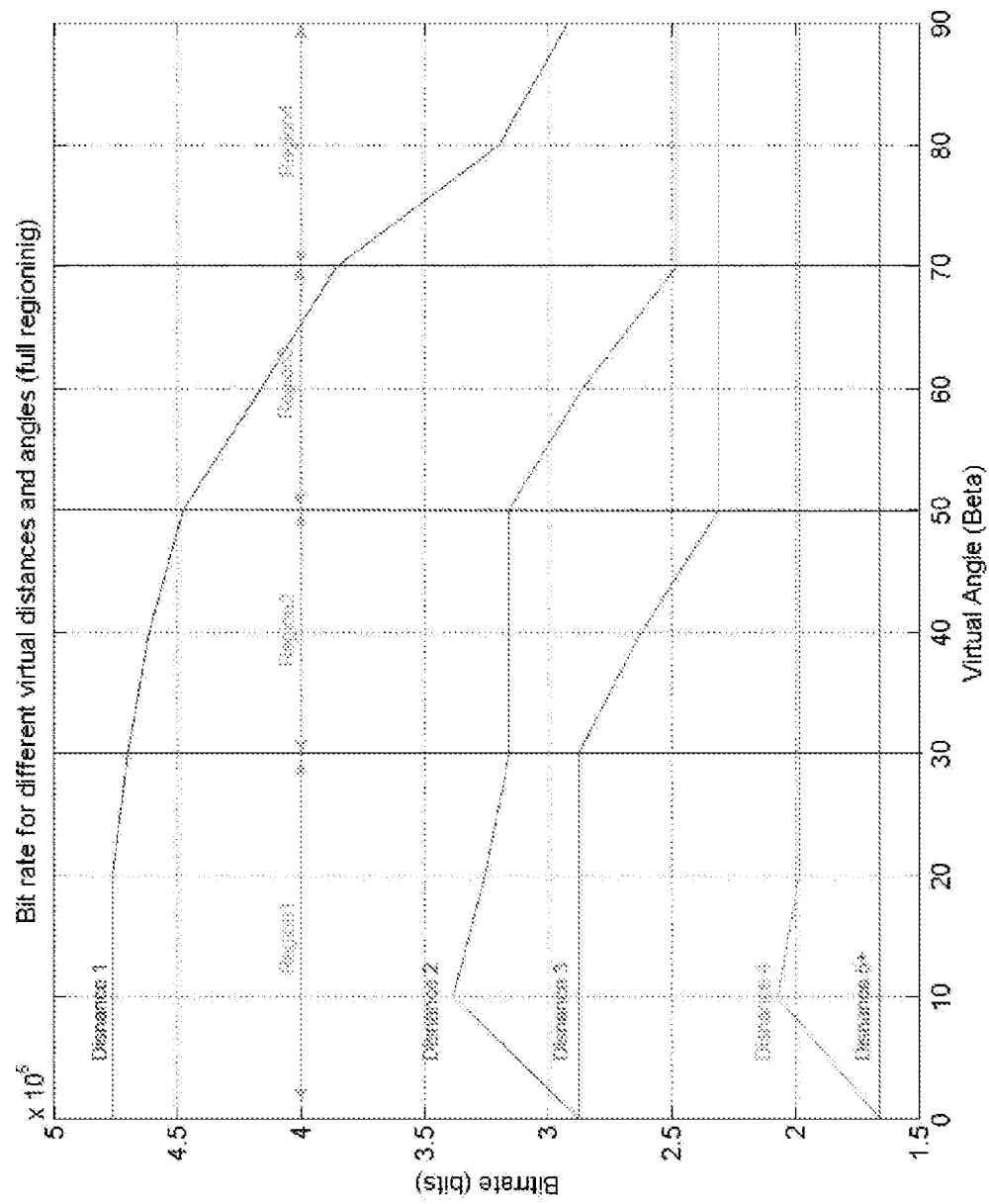
FIG. 15 shows bitrate saving for images at different distances and angles.

FIG. 15 shows the bit rate reduction after perceptual pruning based on variations of virtual distance and angular orientation. It is clear that large bitrate savings can be generated using a small number of zones/regions.

Transformation of a video stream's representation on the screen can be produced by a succession of affine transformations in a 3D world. It also includes the common practice of displaying videos of participants as rectangular tiles on the screen utilised by conventional video conferencing systems. Hence, the perceptual pruning mechanism is completely applicable regardless of the approach (2D or 3D) or UI design of the system. In fact, the conventional representation of the participants as rectangular tiles with different sizes on the screen, as shown in FIGS. 3c and 3d, is one of the transformations that can be handled by the perceptual pruning mechanism. This transformation is equivalent to change of the virtual distance, which would result in smaller or bigger projection of the video stream on the screen with no distortion (which is usually caused by rotation).

Virtual Orientation:

In this experiment, the video surface is located at (0,0,1), while its orientation is varied. The perceptual pruning mechanism is performed for 0, 30, 60 and 80 degree rotation of the video surface about the local y axis (beta) and the achieved images are compared outside and inside of IVC. Like the previous experiment two different spatial partitioning (8×8 and 4×4) are examined.

The objective assessment results demonstrate the amount of degradation as shown in Table 7 and 8, the more the frequencies are zeroed out, the worst the perceptual quality and the bigger the error are gained in 2D presentation of the image outside IVC.

TABLE 7 the comparison of degraded image vs the reference image outside IVC with 4 × 4 macroblocks

| angle | MSE | PSNR | SSIM |
|---|---|---|---|
| 0 | 0 | inf | 1 |
| 30 | 1.7773 | 45.6671 | 0.9927 |
| 60 | 13.158 | 36.9729 | 0.9582 |
| 80 | 47.6192 | 31.387 | 0.8779 |

TABLE 8 the comparison of degraded image vs the reference image outside IVC with 8 × 8 macroblocks

| angle | MSE | PSNR | SSIM |
|---|---|---|---|
| 0 | 0 | inf | 1 |
| 30 | 2.1359 | 44.869 | 0.9909 |
| 60 | 14.2281 | 36.6333 | 0.9516 |
| 80 | 49.2791 | 31.2382 | 0.8686 |

Figure 12:
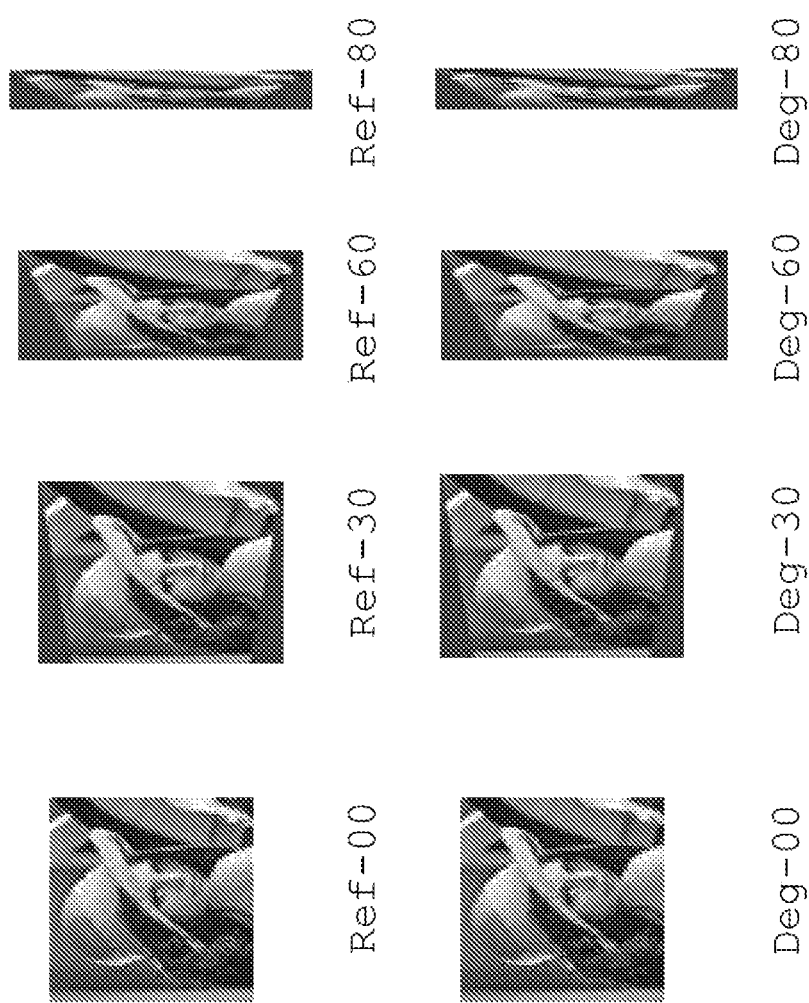
FIG. 12 shows perceptual pruning for various virtual orientations (3D presentation).

The experiment is repeated again, but this time the reference and degraded images are applied on the video surface (FIG. 12). The results achieved from the three dimensional presentation of degraded images compared to the references with same angular states suggest a totally different behaviour and confirm our hypothesis. Despite the amount of DCT down sampling, the reference and degraded images have insignificant error and they are perceptually similar (Table 9 and 10).

TABLE 9 the comparison of degraded image vs the reference image inside IVC with 4 × 4 macroblocks

| angle | MSE | PSNR | SSIM |
|---|---|---|---|
| 0 | 0 | inf | 1 |
| 30 | 0.8306 | 48.9707 | 0.9976 |
| 60 | 1.3789 | 46.7694 | 0.995 |
| 80 | 0.7742 | 49.2761 | 0.9982 |

TABLE 10 the comparison of degraded image vs the reference image inside IVC with 8 × 8 macroblocks

| angle | MSE | PSNR | SSIM |
|---|---|---|---|
| 0 | 0 | inf | 1 |
| 30 | 1.9885 | 45.1796 | 0.9944 |
| 60 | 2.3307 | 44.4899 | 0.9918 |
| 80 | 1.8712 | 45.4436 | 0.9965 |

Table 11 shows the amount coefficients that are replaced with zero for each orientation. As expected, the higher the beta is, the more coefficients are zeroed out and more bandwidth consumption can be saved.

TABLE 11

The number and percentage of zero coefficients vs non zero coefficients for various virtual orientations

| | | No. zeros(8 × 8) | | No. zeros(4 × 4) | | Percentage (8 × 8) | | Percentage (4 × 4) | |
|---|---|---|---|---|---|---|---|---|---|
| Angle | No. Coef | before | after | before | after | before | after | before | after |
| 0 | 262144 | 213 | 213 | 3229 | 3229 | 0.081253 | 0.081253 | 1.231766 | 1.231766 |
| 30 | 262144 | 213 | 28052 | 3229 | 20976 | 0.081253 | 10.70099 | 1.231766 | 8.001709 |
| 60 | 262144 | 213 | 99680 | 3229 | 82714 | 0.081253 | 38.0249 | 1.231766 | 31.55289 |
| 80 | 262144 | 213 | 173362 | 3229 | 159244 | 0.081253 | 66.13235 | 1.231766 | 60.74677 |

The pruning technique provides large technical benefits to the system. When the image processing is performed at the server, each participant in a multi-party video-conference can reduce the data in downlink direction by up to around 30% per video stream. Such reductions can help to make these video conference solutions viable on networks, for example mobile networks, with lower bandwidth as well as fixed line networks.

Visual Effects

In further embodiments degrading of the image quality could also be applied based on further perceptual requirements of a user. Selected images could be degraded to provide additional data savings in the system. Due to artistic designs or improving the usability of the system, some visual effects such as blurring, reducing the brightness or intensity of the video (colour components) of the image can be applied to reduce data requirements.

These visual effects can be achieved by dropping or manipulating the respective components of the video data, which usually results in a smaller video stream in terms of bit rates. For example parameters including (sharpness, intensity, brightness, grey-scale) with values ranging from 1 to 0 are integrated with perceptual pruning. The normal output of the perceptual pruning mechanism as discussed above is achieved when all these parameters have their maximum values (1). By reducing the values the corresponding components of the video frame are dropped/manipulated on the server side and a smaller video stream with the respective effects (e.g. blurred video or grey-scale video) are transmitted to the peers. By utilising this feature the scalability of the system can be further improved.

Figure 14:
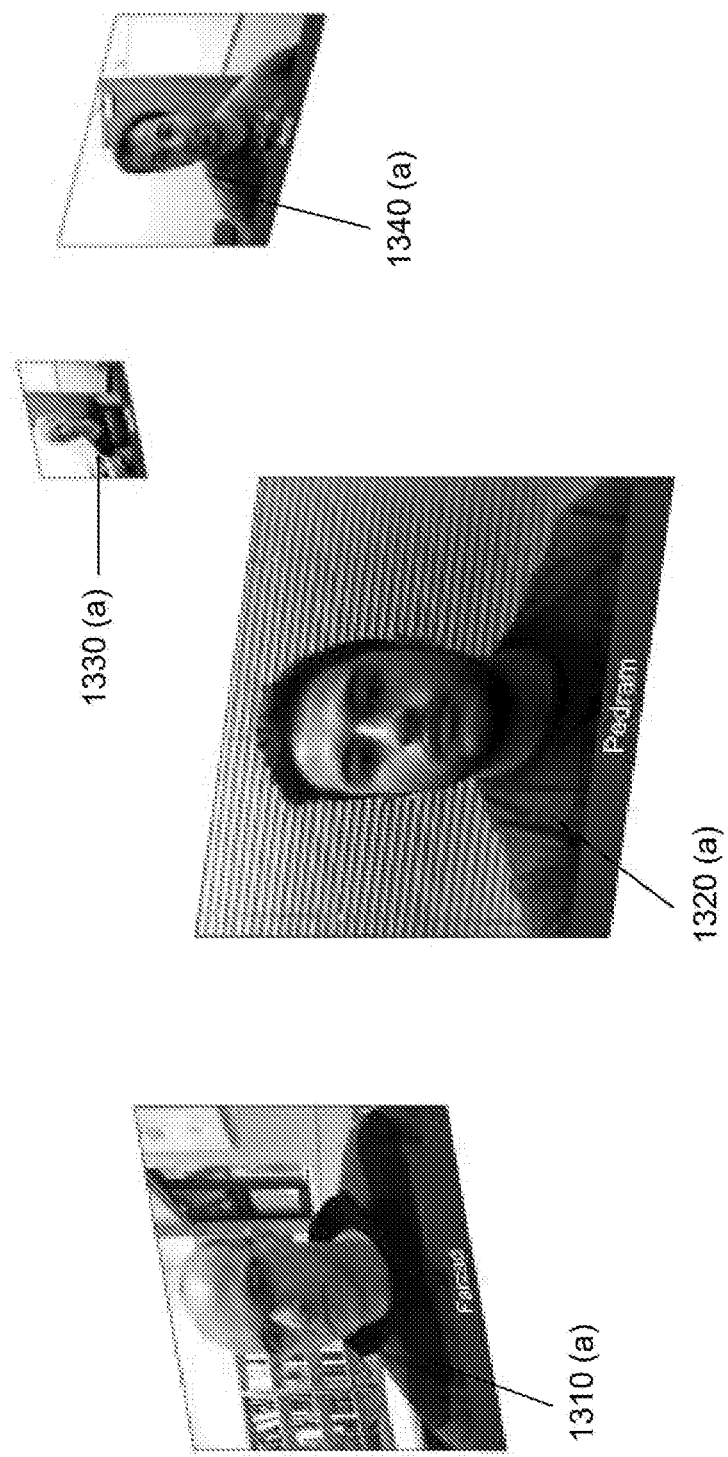
FIG. 14 shows one form of a plurality of avatars in the virtual environment.

FIGS. 13 and 14 show examples of a video conference from the perspective of a user at different times during the video conference. FIG. 13 represents the video at time T1 and FIG. 14 represents the video at time T2. The video conference includes four participants 1310 1320 1330 1340 viewed by the user. Depending on the significance of the participants at any time the parameters of sharpness, intensity, colour and brightness can be changed. At time T2 (FIG. 14) the image parameters for participants 1330(a) 1340(a) have been downgraded compared with the same images at time T1 (FIG. 13). Downgrading the image parameters reduces the data requirements for that image. Such algorithms can be used in addition to the algorithms associated with those for location and orientation discussed above to provide further benefits of the system.

Lookup Tables for Reducing the Computational Cost

Many of the embodiments described above provide a generic mechanism that can handle full range of motion of frames and static frames within the video environment. In any arbitrary sized spatial region employing the matrix transformation of blocks as presented above, the projection sizes of fixed sized spatial regions (e.g. blocks of 4×4 or 8×8 pixels), when the virtual motion is limited (i.e. avatars and the camera can only be rotate about their local y axes) can be precomputed for combinations of virtual situations. For example, 3 different virtual distances (d<2, 2<d<5 and d>5), 4 virtual orientation of video surface (Beta<20, 20<Beta<50, 50<Beta<70 and 70<Beta<90) and 3 different virtual orientation of the camera (Beta0<10, 10<Beta0<30 and Beta0>30). Such precomputed values can be used in real-time to minimise the computational cost of the projection calculation process.

By this approach, the maximum bitrate saving might not be achieved. Since the maximum size of the projected blocks in each column is used for all the blocks, the projection sizes of some blocks might be overestimated and hence the maximum saving might not be obtained. However, as the projected blocks' sizes are very close in a column the trade off between computational cost against granular identification of change in block size may be beneficial. Such embodiments could be employed in a server which has met its computational limits due to the number of participants and cannot handle the intensive process of transformation calculations. The performance of the mechanism in terms of reducing the required network capacity can be sacrificed for reducing the computational cost. In this approach, the virtual state of each avatar or video surface with respect to the camera can be characterised by parameters including d, Beta and Beta0. Further parameters include the block size. Then the estimated required spatial quality, the matrix of the perceptual pruning mask of each region, can be retrieved from a lookup table based on the parameters. The look up table may be stored locally or remotely.

The pruning technique can be used in isolation or in combination with any of the culling techniques discussed above.

The pruning technique is discussed above in relation to an immersive video conferencing system. However, it will be clear to those skilled in the art that the applications of the pruning technique extend beyond immersive video conferencing. Further uses in virtual environment applications include gaming, in which a video stream or image is presented on a character or object within the game.

Additionally, the technique could be used on video screen in real-life applications. The principle of degrading image quality without perceptual impact exists in real life and can be exploited on television screen or any screen displaying an image. In such cases, if the system monitors the location of a viewer of video content with respect to the screen, it could execute the pruning technique to control the quality of the video image displayed on the screen in dependence on the location of the viewer. As a viewer's perspective of the screen changes, the system can change the quality of the image as necessary. This could be executed at the server distributor side to save bandwidth or at the client end. The application would only be commercially useful in the situation when a single person was viewing the screen since the pruning is performed on a per perception basis and the perception of the same image is different for viewers at different locations with respect to the screen.

In this specification the term video image should be understood to include a video stream as well as a single image.

It should be understood the methods and order of applying the various techniques described in this specification are exemplary embodiments. It is envisaged that any number of data culling techniques described could be applied in any order, and the specification is not limited to a specific number or application order. It should be understood the applicant has devised a method and system for managing multimedia data in a virtual environment using predetermined criterion which is the application of data culling techniques.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing systems or partly implemented by computing systems then any appropriate computing system architecture may be utilised. This will include stand alone computers, network computers tablet computers, mobile phones, dedicated hardware devices and virtual machines. Where the terms "computing system" and "computing device" are used, these terms are intended to cover any appropriate arrangement of computer hardware capable of implementing the function described.

The invention claimed is:

1. A computer implemented method for creating a video image for display on at least one client within a multiparty video conferencing system, the client comprising one or more graphical user interfaces, the video data stream created to meet the perceptual requirements of a viewer within a virtual environment representing the video conferencing system, comprising the steps of:
    at a processor, receiving a first client video image, associated with a first client in the multiparty video conferencing system;
    receiving spatial coordinates of a video surface associated with the first client within the virtual environment;
    receiving from a viewer client spatial coordinates of a viewpoint associated with the viewer client within the virtual environment;
    spatially degrading the video image in dependence on the positions and orientations of the viewpoint and the video surface within the virtual environment, the step of spatially degrading the video image is performed by:
        dividing the video image into portions;
        calculating the size of the portions of the video image as perceived by the viewer in the virtual environment; and
        spatially degrading the video image using a frequency masking method applied in the Discrete Cosine Transformation domain by setting a number of coefficients in the DCT domain to zero in dependence on the size of the portion as perceived by the viewer client within the virtual environment;
    transmitting the degraded video stream to the viewer client for display within the virtual environment; and
    receiving updated spatial coordinates and updating the spatial degradation of the video image in dependence on the updated spatial coordinates.

2. The method according to claim 1 the video image is spatially degraded such that the perceived quality of the image by the viewer client is maintained as the viewpoint moves with respect to the image.

3. The method according to claim 1 wherein spatial degradation is applied to each portion based on the distortion of each portion as perceived at the viewpoint.

4. The method according to claim 3 wherein the distortion is the change in perceived size of the portion.

5. The method according to claim 3 wherein the distortion is calculated by matrix transformation.

6. The method according to claim 1 wherein the DCT down sampling method only requires inverse entropy coding.

7. The method according to claim 1 wherein the video image is a video data stream.

8. The method according to, claim 1 wherein the video surface is an avatar in the virtual environment.

9. An apparatus for creating a video data stream for display on at least one client within a multiparty video conferencing system, the client comprising one or more graphical user interfaces, the video data stream created to meet the perceptual requirements of a viewer within a virtual environment representing the video conferencing system, comprising:
    a processor for receiving a first client video image, associated with a first client in the multiparty video conferencing system;
    a receiver for receiving spatial coordinates of a video surface associated with the first client within the virtual environment;
    a receiver for receiving from a viewer client spatial coordinates of a viewpoint associated with the viewer client within the virtual environment;
    a processor for spatially degrading the video image in dependence on the positions and orientations of the viewpoint and the video surface within the virtual environment, the processor configured to spatially degrade the video image by:
        dividing the video image into portions;
        calculating the size of the portions of the video image as perceived by the viewer in the virtual environment; and
        spatially degrading the video image using a frequency masking method applied in the Discrete Cosine Transformation domain by setting a number of coefficients in the DCT domain to zero in dependence on the size of the portion as perceived by the viewer client within the virtual environment;
    a transmitter for transmitting the degraded video stream to the viewer client for display within the virtual environment,
    the receiver being configured to receive updated spatial coordinates and the processor being configured to update the spatial degradation of the video image in dependence on the updated spatial coordinates.

10. The apparatus according to claim 9 the processor being configured to spatially degrade the image such that the perceived quality of the image by the viewer client is maintained as the viewpoint moves with respect to the image.

11. The apparatus according to claim 9 comprising means for applying spatial degradation to each portion based on the distortion of each portion as perceived by the viewer.

12. The apparatus according to claim 11 wherein the distortion is the change in perceived size of the portion.

13. The apparatus according to claim 11 wherein the distortion is calculated by matrix transformation.

14. The apparatus according to claim 9 wherein the video image is a video data stream.

15. The apparatus according to claim 9 wherein the video surface is an avatar in the virtual environment.

* * * * *